(12) United States Patent
Brodsky et al.

(10) Patent No.: US 12,307,004 B2
(45) Date of Patent: May 20, 2025

(54) RENDERING LOCATION SPECIFIC VIRTUAL CONTENT IN ANY LOCATION

(71) Applicant: Magic Leap, Inc., Plantation, FL (US)

(72) Inventors: Jonathan Brodsky, Fort Lauderdale, FL (US); Javier Antonio Busto, Plantation, FL (US); Martin Wilkins Smith, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/460,873

(22) Filed: Sep. 5, 2023

(65) Prior Publication Data

US 2024/0069628 A1 Feb. 29, 2024

Related U.S. Application Data

(63) Continuation of application No. 17/547,773, filed on Dec. 10, 2021, now Pat. No. 11,789,524, which is a
(Continued)

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G06T 19/003* (2013.01);
(Continued)

(58) Field of Classification Search
None
See application file for complete search history.

(56) References Cited

U.S. PATENT DOCUMENTS 8,243,102 B1   8/2012   Cornell
8,350,758 B1   1/2013   Parvizi et al.
(Continued)

FOREIGN PATENT DOCUMENTS

CA      2788836 A1      9/2011
CN    101543029 A       9/2009
(Continued)

OTHER PUBLICATIONS

Chinese Office Action dated Dec. 22, 2023 in connection with Chinese Application No. 201980080535.5.
(Continued)

*Primary Examiner* — Jason A Pringle-Parker
(74) *Attorney, Agent, or Firm* — Wolf, Greenfield & Sacks, P.C.

(57) ABSTRACT

Augmented reality systems and methods for creating, saving and rendering designs comprising multiple items of virtual content in a three-dimensional (3D) environment of a user. The designs may be saved as a scene, which is built by a user from pre-built sub-components, built components, and/or previously saved scenes. Location information, expressed as a saved scene anchor and position relative to the saved scene anchor for each item of virtual content, may also be saved. Upon opening the scene, the saved scene anchor node may be correlated to a location within the mixed reality environment of the user for whom the scene is opened. The virtual items of the scene may be positioned with the same relationship to that location as they have to the saved scene anchor node. That location may be selected automatically and/or by user input.

10 Claims, 22 Drawing Sheets

Related U.S. Application Data continuation of application No. 16/593,227, filed on Oct. 4, 2019, now Pat. No. 11,232,635.

(60) Provisional application No. 62/742,061, filed on Oct. 5, 2018.

(51) Int. Cl.
  *G06F 3/04815* (2022.01)
  *G06T 19/00* (2011.01)
  *G06V 10/764* (2022.01)
  *G06V 10/82* (2022.01)
  *G06V 20/20* (2022.01)

(52) U.S. Cl.
  CPC .......... *G06T 19/006* (2013.01); *G06V 10/764* (2022.01); *G06V 10/82* (2022.01); *G06V 20/20* (2022.01); *G06F 3/04815* (2013.01)

(56) References Cited

U.S. PATENT DOCUMENTS

| | | | |
|---|---|---|---|
| 8,832,233 B1* | 9/2014 | Brin | G06Q 30/0643 709/227 |
| 8,849,957 B1 | 9/2014 | Boodman et al. | |
| 9,041,739 B2* | 5/2015 | Latta | G06Q 50/01 345/633 |
| 9,088,787 B1* | 7/2015 | Smith | H04N 13/194 |
| 9,332,285 B1* | 5/2016 | Grant | H04N 21/23439 |
| 9,467,718 B1 | 10/2016 | Newell et al. | |
| 10,192,145 B2 | 1/2019 | Ben Himane et al. | |
| 10,261,555 B1 | 4/2019 | Cooper et al. | |
| 10,335,572 B1 | 7/2019 | Kumar | |
| 10,373,366 B2 | 8/2019 | Forutanpour et al. | |
| 10,492,981 B1 | 12/2019 | Kumar | |
| 10,504,008 B1 | 12/2019 | Powers et al. | |
| 10,565,731 B1 | 2/2020 | Reddy et al. | |
| 10,748,302 B1 | 8/2020 | Dine et al. | |
| 10,852,828 B1 | 12/2020 | Gatson et al. | |
| 10,854,012 B1 | 12/2020 | Iyer et al. | |
| 10,885,714 B2 | 1/2021 | Finman et al. | |
| 10,957,112 B2 | 3/2021 | Miranda et al. | |
| 11,024,078 B2 | 6/2021 | Venshtain et al. | |
| 11,201,981 B1 | 12/2021 | Suiter et al. | |
| 11,227,435 B2 | 1/2022 | Mohan et al. | |
| 11,232,635 B2 | 1/2022 | Brodsky et al. | |
| 11,257,294 B2 | 2/2022 | Zhao et al. | |
| 11,386,627 B2 | 7/2022 | Caswell et al. | |
| 11,386,629 B2 | 7/2022 | Miranda et al. | |
| 11,410,395 B2 | 8/2022 | Velasquez et al. | |
| 11,488,322 B2 | 11/2022 | Liu et al. | |
| 11,551,430 B2 | 1/2023 | Velasquez et al. | |
| 11,562,525 B2 | 1/2023 | Joseph et al. | |
| 11,562,542 B2 | 1/2023 | Zhang et al. | |
| 11,568,605 B2 | 1/2023 | Shahrokni et al. | |
| 11,632,679 B2 | 4/2023 | Shveki et al. | |
| 11,748,963 B2 | 9/2023 | Zhang et al. | |
| 11,789,524 B2 | 10/2023 | Brodsky et al. | |
| 11,790,619 B2 | 10/2023 | Velasquez et al. | |
| 11,830,149 B2 | 11/2023 | Zhao et al. | |
| 11,869,158 B2 | 1/2024 | Caswell et al. | |
| 11,900,547 B2 | 2/2024 | Gomez Gonzalez et al. | |
| 11,967,020 B2 | 4/2024 | Joseph et al. | |
| 11,978,159 B2 | 5/2024 | Mohan et al. | |
| 11,995,782 B2 | 5/2024 | Shahrokni et al. | |
| 12,067,687 B2 | 8/2024 | Zhang et al. | |
| 12,100,108 B2 | 9/2024 | Shahrokni et al. | |
| 2002/0084974 A1* | 7/2002 | Ohshima | G06F 3/011 345/156 |
| 2005/0007261 A1* | 1/2005 | Berson | G01C 23/00 345/428 |
| 2006/0080354 A1 | 4/2006 | Berger et al. | |
| 2007/0298866 A1 | 12/2007 | Gaudiano et al. | |
| 2009/0031228 A1 | 1/2009 | Buchs et al. | |
| 2009/0202179 A1 | 8/2009 | Shivanna et al. | |
| 2009/0215536 A1 | 8/2009 | Yee et al. | |
| 2009/0241037 A1 | 9/2009 | Hyndman | |
| 2009/0256903 A1 | 10/2009 | Spooner et al. | |
| 2010/0169837 A1 | 7/2010 | Hyndman | |
| 2010/0191124 A1 | 7/2010 | Prokoski | |
| 2010/0208033 A1* | 8/2010 | Edge | G06T 19/006 348/46 |
| 2010/0208057 A1 | 8/2010 | Meier et al. | |
| 2010/0257252 A1 | 10/2010 | Dougherty et al. | |
| 2010/0287485 A1 | 11/2010 | Bertolami et al. | |
| 2010/0321390 A1 | 12/2010 | Kim et al. | |
| 2011/0083101 A1 | 4/2011 | Sharon et al. | |
| 2011/0122308 A1 | 5/2011 | Duparre | |
| 2011/0208817 A1 | 8/2011 | Toledano et al. | |
| 2011/0254950 A1 | 10/2011 | Bibby et al. | |
| 2011/0299736 A1 | 12/2011 | Choi et al. | |
| 2012/0130632 A1 | 5/2012 | Bandyopadhyay et al. | |
| 2012/0169887 A1 | 7/2012 | Zhu et al. | |
| 2012/0188237 A1 | 7/2012 | Han et al. | |
| 2012/0191737 A1 | 7/2012 | Han et al. | |
| 2012/0194419 A1 | 8/2012 | Osterhout et al. | |
| 2012/0249591 A1 | 10/2012 | Maciocci et al. | |
| 2012/0249741 A1* | 10/2012 | Maciocci | G06T 19/006 348/51 |
| 2012/0294231 A1 | 11/2012 | Finlow-Bates et al. | |
| 2012/0306850 A1 | 12/2012 | Balan et al. | |
| 2013/0002815 A1 | 1/2013 | Smoot et al. | |
| 2013/0044128 A1 | 2/2013 | Liu et al. | |
| 2013/0083173 A1* | 4/2013 | Geisner | G06T 19/006 348/51 |
| 2013/0141419 A1 | 6/2013 | Mount et al. | |
| 2013/0162481 A1 | 6/2013 | Parvizi et al. | |
| 2013/0176430 A1 | 7/2013 | Zhu et al. | |
| 2013/0201185 A1* | 8/2013 | Kochi | A63F 13/213 345/419 |
| 2013/0215264 A1 | 8/2013 | Soatto et al. | |
| 2013/0222555 A1 | 8/2013 | Nagasaka et al. | |
| 2013/0257858 A1 | 10/2013 | Na et al. | |
| 2013/0257907 A1 | 10/2013 | Matsui | |
| 2013/0282345 A1* | 10/2013 | McCulloch | G06F 3/0304 703/6 |
| 2013/0293468 A1 | 11/2013 | Perez et al. | |
| 2013/0321402 A1 | 12/2013 | Moore et al. | |
| 2013/0321671 A1 | 12/2013 | Cote et al. | |
| 2013/0321678 A1 | 12/2013 | Cote et al. | |
| 2013/0342671 A1 | 12/2013 | Hummel et al. | |
| 2014/0002607 A1 | 1/2014 | Shotton et al. | |
| 2014/0003762 A1 | 1/2014 | Macnamara | |
| 2014/0010407 A1 | 1/2014 | Sinha et al. | |
| 2014/0097329 A1 | 4/2014 | Wadsworth | |
| 2014/0119602 A1 | 5/2014 | Zuo | |
| 2014/0137100 A1 | 5/2014 | Won et al. | |
| 2014/0211855 A1 | 7/2014 | Alipour Kashi et al. | |
| 2014/0248950 A1 | 9/2014 | Tosas Bautista | |
| 2014/0254936 A1 | 9/2014 | Sun et al. | |
| 2014/0254942 A1 | 9/2014 | Liu et al. | |
| 2014/0267234 A1 | 9/2014 | Hook et al. | |
| 2014/0282162 A1 | 9/2014 | Fein et al. | |
| 2014/0289607 A1 | 9/2014 | Ko et al. | |
| 2014/0295878 A1 | 10/2014 | Yang et al. | |
| 2014/0306866 A1 | 10/2014 | Miller et al. | |
| 2014/0315570 A1 | 10/2014 | Yun et al. | |
| 2014/0368645 A1 | 12/2014 | Ahuja et al. | |
| 2014/0372957 A1 | 12/2014 | Keane et al. | |
| 2014/0375688 A1 | 12/2014 | Redmann et al. | |
| 2015/0016777 A1 | 1/2015 | Abovitz et al. | |
| 2015/0026642 A1 | 1/2015 | Wilson et al. | |
| 2015/0049004 A1 | 2/2015 | Deering et al. | |
| 2015/0049201 A1 | 2/2015 | Liu et al. | |
| 2015/0071524 A1 | 3/2015 | Lee | |
| 2015/0126223 A1 | 5/2015 | Lee et al. | |
| 2015/0161476 A1 | 6/2015 | Kurz et al. | |
| 2015/0178939 A1 | 6/2015 | Bradski et al. | |
| 2015/0186745 A1 | 7/2015 | Martini | |
| 2015/0187133 A1 | 7/2015 | Martini | |
| 2015/0205126 A1 | 7/2015 | Schowengerdt | |
| 2015/0235447 A1 | 8/2015 | Abovitz et al. | |
| 2015/0254818 A1 | 9/2015 | Li et al. | |
| 2015/0279081 A1 | 10/2015 | Monk et al. | |

(56) References Cited

U.S. PATENT DOCUMENTS

| | | |
|---|---|---|
| 2015/0281869 A1 | 10/2015 | Ramachandran et al. |
| 2015/0302642 A1 | 10/2015 | Miller |
| 2015/0302652 A1 | 10/2015 | Miller et al. |
| 2015/0302656 A1 | 10/2015 | Miller et al. |
| 2015/0302664 A1 | 10/2015 | Miller |
| 2015/0302665 A1 | 10/2015 | Miller |
| 2015/0309264 A1 | 10/2015 | Abovitz et al. |
| 2015/0310664 A1* | 10/2015 | Boussard ............ G06T 19/006 345/633 |
| 2015/0321103 A1 | 11/2015 | Barnett et al. |
| 2016/0005229 A1 | 1/2016 | Lee et al. |
| 2016/0012643 A1 | 1/2016 | Kezele et al. |
| 2016/0026253 A1 | 1/2016 | Bradski et al. |
| 2016/0071278 A1 | 3/2016 | Leonard et al. |
| 2016/0086381 A1 | 3/2016 | Jung et al. |
| 2016/0147408 A1* | 5/2016 | Bevis ............... G02B 27/017 715/850 |
| 2016/0148433 A1 | 5/2016 | Petrovskaya et al. |
| 2016/0154821 A1 | 6/2016 | Kansal et al. |
| 2016/0179830 A1 | 6/2016 | Schmalstieg et al. |
| 2016/0180593 A1 | 6/2016 | Yang |
| 2016/0180602 A1 | 6/2016 | Fuchs |
| 2016/0196692 A1 | 7/2016 | Kjallstrom et al. |
| 2016/0217614 A1 | 7/2016 | Kraver et al. |
| 2016/0219408 A1 | 7/2016 | Yang et al. |
| 2016/0262253 A1 | 9/2016 | Isaacs et al. |
| 2016/0284314 A1 | 9/2016 | Darshan et al. |
| 2016/0300389 A1 | 10/2016 | Glenn, III et al. |
| 2016/0335275 A1 | 11/2016 | Williams et al. |
| 2016/0343165 A1 | 11/2016 | Park et al. |
| 2016/0358383 A1* | 12/2016 | Gauglitz ............ G06F 3/0304 |
| 2016/0360111 A1 | 12/2016 | Thivent et al. |
| 2016/0370971 A1 | 12/2016 | Hackett et al. |
| 2016/0381118 A1 | 12/2016 | Andrews et al. |
| 2017/0004658 A1 | 1/2017 | Hammond |
| 2017/0031160 A1 | 2/2017 | Popovich et al. |
| 2017/0061696 A1 | 3/2017 | Li et al. |
| 2017/0076408 A1 | 3/2017 | D'Souza et al. |
| 2017/0076499 A1 | 3/2017 | Jiang et al. |
| 2017/0091996 A1 | 3/2017 | Wei et al. |
| 2017/0094227 A1 | 3/2017 | Williams et al. |
| 2017/0134909 A1 | 5/2017 | Gu et al. |
| 2017/0185823 A1 | 6/2017 | Gold et al. |
| 2017/0192515 A1 | 7/2017 | Menadeva et al. |
| 2017/0195564 A1 | 7/2017 | Appia et al. |
| 2017/0208109 A1* | 7/2017 | Akselrod ............ G06T 19/006 |
| 2017/0228878 A1 | 8/2017 | Goldman et al. |
| 2017/0236037 A1 | 8/2017 | Rhoads et al. |
| 2017/0237789 A1 | 8/2017 | Harner et al. |
| 2017/0243352 A1 | 8/2017 | Kutliroff et al. |
| 2017/0270713 A1 | 9/2017 | Dooley et al. |
| 2017/0323472 A1 | 11/2017 | Barnes et al. |
| 2017/0336511 A1 | 11/2017 | Nerurkar et al. |
| 2017/0345167 A1 | 11/2017 | Ard et al. |
| 2017/0345215 A1 | 11/2017 | Khedkar et al. |
| 2017/0352192 A1 | 12/2017 | Petrovskaya et al. |
| 2017/0358140 A1 | 12/2017 | Kohler et al. |
| 2017/0371024 A1 | 12/2017 | Ivanov et al. |
| 2018/0000547 A1 | 1/2018 | Kang et al. |
| 2018/0005015 A1 | 1/2018 | Hou et al. |
| 2018/0012074 A1 | 1/2018 | Holz et al. |
| 2018/0045963 A1 | 2/2018 | Hoover et al. |
| 2018/0053284 A1 | 2/2018 | Rodriguez et al. |
| 2018/0053315 A1 | 2/2018 | Ard et al. |
| 2018/0081429 A1 | 3/2018 | Akenine-Moller et al. |
| 2018/0082156 A1 | 3/2018 | Jin et al. |
| 2018/0089834 A1 | 3/2018 | Spizhevoy et al. |
| 2018/0114065 A1 | 4/2018 | Zeng |
| 2018/0122143 A1 | 5/2018 | Ellwood, Jr. |
| 2018/0137651 A1 | 5/2018 | Levinshtein et al. |
| 2018/0164877 A1 | 6/2018 | Miller et al. |
| 2018/0189556 A1 | 7/2018 | Shamir et al. |
| 2018/0213359 A1 | 7/2018 | Reinhardt et al. |
| 2018/0218222 A1 | 8/2018 | Alrabeiah et al. |
| 2018/0245927 A1 | 8/2018 | Frish et al. |
| 2018/0261012 A1 | 9/2018 | Mullins et al. |
| 2018/0268237 A1 | 9/2018 | Stanimirovic et al. |
| 2018/0268582 A1 | 9/2018 | Schneider et al. |
| 2018/0268611 A1 | 9/2018 | Nourai et al. |
| 2018/0276882 A1* | 9/2018 | Harviainen ........... G06T 19/006 |
| 2018/0284802 A1 | 10/2018 | Tsai et al. |
| 2018/0285052 A1 | 10/2018 | Eade et al. |
| 2018/0286116 A1 | 10/2018 | Jd |
| 2018/0293771 A1 | 10/2018 | Piemonte et al. |
| 2018/0304153 A1 | 10/2018 | Hohjoh et al. |
| 2018/0307303 A1 | 10/2018 | Powderly et al. |
| 2018/0307941 A1 | 10/2018 | Holz et al. |
| 2018/0308377 A1 | 10/2018 | Pena-Rios et al. |
| 2018/0315248 A1 | 11/2018 | Bastov et al. |
| 2018/0330521 A1 | 11/2018 | Samples et al. |
| 2019/0005725 A1 | 1/2019 | Oonishi |
| 2019/0027267 A1 | 1/2019 | Hayashi et al. |
| 2019/0035047 A1 | 1/2019 | Lim et al. |
| 2019/0065814 A1 | 2/2019 | Morein et al. |
| 2019/0080467 A1 | 3/2019 | Hirzer et al. |
| 2019/0108578 A1* | 4/2019 | Spivack ............... G09B 5/065 |
| 2019/0114798 A1 | 4/2019 | Afrouzi et al. |
| 2019/0114802 A1 | 4/2019 | Lazarow |
| 2019/0139311 A1 | 5/2019 | Petrovskaya et al. |
| 2019/0147341 A1 | 5/2019 | Rabinovich et al. |
| 2019/0188474 A1 | 6/2019 | Zahnert et al. |
| 2019/0197765 A1 | 6/2019 | Molyneaux et al. |
| 2019/0197785 A1 | 6/2019 | Tate-Gans et al. |
| 2019/0199882 A1 | 6/2019 | Han |
| 2019/0206258 A1 | 7/2019 | Chang et al. |
| 2019/0236797 A1 | 8/2019 | Thyagharajan et al. |
| 2019/0287311 A1 | 9/2019 | Bhatnagar et al. |
| 2019/0301873 A1 | 10/2019 | Prasser et al. |
| 2019/0310761 A1 | 10/2019 | Agarawala et al. |
| 2019/0313059 A1* | 10/2019 | Agarawala ............ G06F 3/011 |
| 2019/0325600 A1 | 10/2019 | Balan et al. |
| 2019/0340831 A1* | 11/2019 | Scarfone ............... G06T 19/20 |
| 2019/0355169 A1 | 11/2019 | Sapienza et al. |
| 2019/0362546 A1 | 11/2019 | Wayenberg |
| 2019/0384379 A1 | 12/2019 | Huh |
| 2019/0385370 A1 | 12/2019 | Boyapalle et al. |
| 2019/0388182 A1 | 12/2019 | Kumar et al. |
| 2020/0005486 A1 | 1/2020 | Sinha et al. |
| 2020/0020137 A1 | 1/2020 | Daniels et al. |
| 2020/0033463 A1 | 1/2020 | Lee et al. |
| 2020/0034624 A1 | 1/2020 | Sharma et al. |
| 2020/0042012 A1 | 2/2020 | Zander |
| 2020/0051328 A1 | 2/2020 | Mohan et al. |
| 2020/0066050 A1 | 2/2020 | Ha et al. |
| 2020/0074739 A1 | 3/2020 | Stauber et al. |
| 2020/0090407 A1 | 3/2020 | Miranda et al. |
| 2020/0097770 A1 | 3/2020 | Sommer et al. |
| 2020/0105059 A1 | 4/2020 | Lukác et al. |
| 2020/0111255 A1 | 4/2020 | Brodsky et al. |
| 2020/0126252 A1 | 4/2020 | Iyer et al. |
| 2020/0126256 A1 | 4/2020 | Sinha et al. |
| 2020/0126309 A1* | 4/2020 | Moroze ................ G06F 3/017 |
| 2020/0134366 A1 | 4/2020 | Xu et al. |
| 2020/0175766 A1 | 6/2020 | Gawrys et al. |
| 2020/0177870 A1 | 6/2020 | Tadi et al. |
| 2020/0195904 A1 | 6/2020 | Tauber |
| 2020/0211286 A1 | 7/2020 | Kelsey et al. |
| 2020/0211290 A1 | 7/2020 | Choi et al. |
| 2020/0252233 A1 | 8/2020 | O'Keeffe |
| 2020/0271450 A1 | 8/2020 | Gorur Sheshagiri et al. |
| 2020/0322595 A1 | 10/2020 | Abe et al. |
| 2020/0334842 A1 | 10/2020 | Michielin et al. |
| 2020/0342670 A1 | 10/2020 | Nattinger et al. |
| 2020/0342680 A1 | 10/2020 | Blikas et al. |
| 2020/0349730 A1 | 11/2020 | Chen |
| 2020/0364901 A1 | 11/2020 | Choudhuri et al. |
| 2020/0364937 A1 | 11/2020 | Selbrede |
| 2020/0372672 A1 | 11/2020 | Schonberger et al. |
| 2020/0380263 A1 | 12/2020 | Yang et al. |
| 2020/0380769 A1 | 12/2020 | Liu et al. |
| 2020/0394012 A1 | 12/2020 | Wright, Jr. et al. |
| 2020/0401617 A1 | 12/2020 | Spiegel et al. |
| 2021/0019909 A1 | 1/2021 | Wang et al. |
| 2021/0049360 A1 | 2/2021 | Yildiz et al. |

(56) References Cited

U.S. PATENT DOCUMENTS

| | | |
|---|---|---|
| 2021/0065455 A1 | 3/2021 | Beith et al. |
| 2021/0074072 A1 | 3/2021 | Desai et al. |
| 2021/0103449 A1 | 4/2021 | Terpstra et al. |
| 2021/0105340 A1 | 4/2021 | Grozdanov et al. |
| 2021/0110614 A1 | 4/2021 | Shahrokni et al. |
| 2021/0110615 A1 | 4/2021 | Zhao et al. |
| 2021/0112427 A1 | 4/2021 | Shveki et al. |
| 2021/0125414 A1 | 4/2021 | Berkebile |
| 2021/0134064 A1 | 5/2021 | Shahrokni et al. |
| 2021/0141384 A1 | 5/2021 | Lacaze et al. |
| 2021/0142580 A1 | 5/2021 | Caswell et al. |
| 2021/0174596 A1 | 6/2021 | Zhang et al. |
| 2021/0209859 A1 | 7/2021 | Miranda et al. |
| 2021/0233330 A1 | 7/2021 | Sutherland et al. |
| 2021/0256755 A1 | 8/2021 | Joseph et al. |
| 2021/0256766 A1 | 8/2021 | Muhlethaler et al. |
| 2021/0256767 A1 | 8/2021 | Velasquez et al. |
| 2021/0256768 A1 | 8/2021 | Zhao et al. |
| 2021/0264620 A1 | 8/2021 | Ramasamy et al. |
| 2021/0264685 A1 | 8/2021 | Velasquez et al. |
| 2021/0295266 A1 | 9/2021 | McKee et al. |
| 2021/0315464 A1 | 10/2021 | Sol I Caros et al. |
| 2021/0343087 A1 | 11/2021 | Gomez Gonzalez et al. |
| 2021/0358150 A1 | 11/2021 | Lin et al. |
| 2022/0036648 A1 | 2/2022 | Wang |
| 2022/0092852 A1 | 3/2022 | Mohan et al. |
| 2022/0101607 A1 | 3/2022 | Brodsky et al. |
| 2022/0130120 A1 | 4/2022 | Zhao et al. |
| 2022/0292789 A1 | 9/2022 | Caswell et al. |
| 2022/0358733 A1 | 11/2022 | Velasquez et al. |
| 2023/0119217 A1 | 4/2023 | Velasquez et al. |
| 2023/0119305 A1 | 4/2023 | Zhang et al. |
| 2023/0127303 A1 | 4/2023 | Shahrokni et al. |
| 2023/0209373 A1 | 6/2023 | Shveki et al. |
| 2023/0222731 A1 | 7/2023 | Joseph et al. |
| 2024/0029369 A1 | 1/2024 | Zhang et al. |
| 2024/0054741 A1 | 2/2024 | Caswell et al. |
| 2024/0062491 A1 | 2/2024 | Velasquez et al. |
| 2024/0087258 A1 | 3/2024 | Zhao et al. |
| 2024/0135656 A1 | 4/2024 | Gomez Gonzalez et al. |
| 2024/0221306 A1 | 7/2024 | Joseph et al. |
| 2024/0257458 A1 | 8/2024 | Mohan et al. |
| 2024/0273841 A1 | 8/2024 | Shahrokni et al. |
| 2024/0362872 A1 | 10/2024 | Zhang et al. |

FOREIGN PATENT DOCUMENTS

| | | |
|---|---|---|
| CN | 102216957 A | 10/2011 |
| CN | 103460255 A | 12/2013 |
| CN | 104508600 A | 4/2015 |
| CN | 104769393 A | 7/2015 |
| CN | 104917955 A | 9/2015 |
| CN | 105188516 A | 12/2015 |
| CN | 106062862 A | 10/2016 |
| CN | 106663411 A | 5/2017 |
| CN | 106937531 A | 7/2017 |
| CN | 107305126 A | 10/2017 |
| CN | 107667331 A | 2/2018 |
| CN | 107810463 A | 3/2018 |
| CN | 107850934 A | 3/2018 |
| CN | 107924584 A | 4/2018 |
| CN | 108398921 A | 8/2018 |
| CN | 108629121 A | 10/2018 |
| CN | 108885522 A | 11/2018 |
| CN | 109521869 A | 3/2019 |
| CN | 109765992 A | 5/2019 |
| CN | 110221690 A | 9/2019 |
| CN | 110411441 A | 11/2019 |
| CN | 112074876 A | 12/2020 |
| CN | 112189335 A | 1/2021 |
| EP | 2359333 A1 | 8/2011 |
| EP | 2808842 B1 | 8/2017 |
| EP | 4046139 A1 | 8/2022 |
| JP | 2011-124957 A | 6/2011 |
| JP | 2013-141049 A | 7/2013 |
| JP | 2014-106602 A | 6/2014 |
| JP | 2014-112055 A | 6/2014 |
| JP | 2014-535042 A | 12/2014 |
| JP | 2015-503141 A | 1/2015 |
| JP | 2015-079490 A | 4/2015 |
| JP | 2015-118442 A | 6/2015 |
| JP | 2016-522463 A | 7/2016 |
| JP | 2016-524128 A | 8/2016 |
| JP | 2016-157458 A | 9/2016 |
| JP | 2016-527477 A | 9/2016 |
| JP | 2016-202708 A | 12/2016 |
| JP | 2016-540957 A | 12/2016 |
| JP | 2017-004533 A | 1/2017 |
| JP | 2017-107604 A | 6/2017 |
| JP | 2017-173564 A | 9/2017 |
| JP | 2017-529635 A | 10/2017 |
| JP | 2018-526698 A | 9/2018 |
| JP | 2021-528781 A | 10/2021 |
| WO | WO 2005/017729 A2 | 2/2005 |
| WO | WO 2012/126500 A1 | 9/2012 |
| WO | WO 2014/164901 A1 | 10/2014 |
| WO | WO 2015/090051 A1 | 6/2015 |
| WO | WO 2015/161307 A1 | 10/2015 |
| WO | WO 2015/192117 A1 | 12/2015 |
| WO | WO 2016/077798 A1 | 5/2016 |
| WO | WO 2017/136833 A1 | 8/2017 |
| WO | WO 2017/213070 A1 | 12/2017 |
| WO | WO 2018/019563 A1 | 2/2018 |
| WO | WO 2018/125428 A1 | 7/2018 |
| WO | WO 2019/046774 A1 | 3/2019 |
| WO | WO 2019/209887 A1 | 10/2019 |
| WO | WO 2019/210284 A1 | 10/2019 |
| WO | WO 2019/221580 A1 | 11/2019 |
| WO | WO 2019/221800 A1 | 11/2019 |
| WO | WO 2021/087065 | 5/2021 |

OTHER PUBLICATIONS

Gomez Gonzalez et al., Cross Reality System for Large Scale Environments, U.S. Appl. No. 18/396,682, filed Dec. 26, 2023.

Sarlin et al., From coarse to fine: Robust hierarchical localization at large scale. Proceedings of the IEEE/CVF Conference on Computer Vision and Pattern Recognition. 2019. pp 12708-12717. doi: 10.1109/cvpr.2019.01300.

International Search Report and Written Opinion for International Application No. PCT/US2019/054836 mailed Dec. 31, 2019.

Extended European Search Report dated Apr. 26, 2022 in connection with European Application No. 19868676.8.

Japanese Office Action dated Nov. 16, 2023 in connection with Japanese Application No. 2021-518536.

[No Author Listed], Axis-angle representation—Wikipedia. 6 pages. Last edited on Feb. 2022. URL:https://en.wikipedia.org/wiki/Axis%E2%80%93angle_representation [retrieved on Feb. 28, 2022].

[No Author Listed], Code release for "learning to find good correspondences" CVPR 2018. GitHub. Sep. 30, 2020. 4 pages. URL:https://github.com/vgc-uvic/learned-correspondence-release [retrieved on Feb. 22, 2022].

[No Author Listed], Combain Location API—API Reference. 14 pages. URL:https://combain.com/api/#combain-location-api [retrieved on Feb. 24, 2021].

[No Author Listed], Content Persistence Fundamentals. Magic Leap, Inc. Oct. 23, 2019. URL:https://developer.magicleap.com/en-us/learn/guides/content-persistence-fundamentals [retrieved on Dec. 31, 2020]. 5 pages.

[No Author Listed], Course (navigation)—Wikipedia. 3 pages. Last edited on Nov. 4, 2021. URL:https://en.wikipedia.org/wiki/Course_(navigation) [retrieved on Feb. 24, 2022].

[No Author Listed], Geohash a lng/at coordinate using hibert space filling curves. GitHub. Apr. 1, 2020. 9 pages. URL:https://github.com/tammoippen/geohash-hilbert [retrieved on Feb. 24, 2022].

[No Author Listed], GitHub—gmplot/gmplot: Plot data on Google Maps, the easy way. Oct. 14, 2021. 2 pages. URL:https://github.com/vgm64/gmplot [retrieved on Feb. 28, 2022].

[No Author Listed], Haversine formula—Wikipedia. 5 pages. Last edited on Jan. 11, 2022. URL:https://en.wikipedia.org/wiki/Haversine_formula [retrieved on Feb. 24, 2022].

(56) References Cited

OTHER PUBLICATIONS

[No Author Listed], Kismet (software). Wikipedia. Last edited on Jan. 27, 2021. 3 pages. URL:https://en.wikipedia.org/wiki/Kismet_(software) [retrieved on Feb. 24, 2021].

[No Author Listed], Points of the Compass—Wikipedia. Last edited on Dec. 4, 2021. 16 pages. URL:https://en.wikipedia.org/wiki/Points_of_the_compass [retrieved on Feb. 24, 2022].

[No Author Listed], Progressive Web Apps. Google Developers. 2022, 5 pages. URL:https://web.dev/progressive-web-apps [retrieved on Feb. 24, 2022].

[No Author Listed], S2 Geometry. 3 pages. URL:http://s2geometry.io/ [retrieved on Feb. 24, 2022].

[No Author Listed], Skid (aerodynamics)—Wikipedia. 2 pages. Last edited on Jun. 17, 2020. URL:https://en.wikipedia.org/wiki/Skid_(aerodynamic) [retrieved on Feb. 24, 2022].

[No Author Listed], sklearn.neighbors.BallTree. 2022. 4 pages. URL:https://scikit-learn.org/stable/modules/generated/sklearn.neighbors.BallTree.html [retrieved on Feb. 24, 2022].

[No Author Listed], Slip (aerodynamics)—Wikipedia. 5 pages. Last edited on Aug. 22, 2021. URL:https://en.wikipedia.org/wiki/Slip_(aerodynamic) [retrieved on Feb. 24, 2022].

[No Author Listed], The difference between virtual reality, Augmented Reality and Mixed Reality. Forbes. Feb. 2, 2018. 5 pages. URL:https://www.forbes.com/sites/quora/2018/02/02/the-difference-between-virtual-reality-augmented-reality-and-mixed-reality/#634116762d07 [retrieved on Dec. 5, 2019].

[No Author Listed], Wi-Fi Location-Based Services 4.1 Design Guide. Jan. 30, 2014. 11 pages. URL:https://www.cisco.com/c/en/us/td/docs/solutions/Enterprise/Mobility/WiFiLBS-DG/wifich2.html.

[No Author Listed], Wigle: Wireless Network Mapping. 2021. 2 pages. URL:https://wigle.net [retrieved on Feb. 24, 2021].

[No Author Listed], Wind Triangle—Wikipedia. 2 pages. Last edited on Nov. 16, 2021. URL:https://en.wikipedia.org/wiki/Wind_triangle [retrieved on Feb. 24, 2022].

Balntas et al., HPatches: A benchmark and evaluation of handcrafted and learned local descriptors. Proceedings of the IEEE Conference on Computer Vision and Pattern Recognition 2017. pp. 5173-5182.

Bansal et al., Blur image detection using Laplacian operator and Open-CV. 2016 International Conference System Modeling & Advancement in Research Trends (SMART). Nov. 2016, pp. 63-67.

Bleser et al., Cognitive learning, monitoring and assistance of industrial workflows using egocentric sensor networks. PloS one. Jun. 30, 2015;10(6):e0127769. 41 pages.

Brachmann et al., Neural-Guided RANSAC: Learning Where to Sample Model Hypotheses. arXiv: 1905.04132v2. Jul. 31, 2019. 17 pages.

Brief, Mobile Image Blur Detection with Machine Learning. May 17, 2019. 14 pages. URL:https://medium.com/snapaddy-tech-blog/mobile-image-blur-detection-with-machine-learning-c0b703eab7de.

Cadena et al., Past, Present, and Future of Simultaneous Localization and Mapping: Toward the Robust-Perception Age. IEEE Transactions on Robotics. Dec. 2016;32(6):1309-1332.

Caswell et al., Cross Reality System With Localization Service and Shared Location-Based Content, U.S. Appl. No. 18/496,407, filed Oct. 27, 2023.

Chatterjee, How to Leverage Geolocation Capabilities to Deliver a Top Notch Mobile App. Jul. 19, 2017. 5 pages. URL:https://www.fingent.com/blog/how-to-leverage-geo-location-capabilities-to-deliver-a-top-notch-mobile-app.

Dang et al., Eigendecomposition-free training of deep networks with zero eigenvalue-based losses. arXiv:1803.08071. Mar. 26, 2018. 25 pages.

Gidaris et al, Unsupervised representation learning by predicting image rotations. arXiv:1803.07728. Mar. 21, 2018. 16 pages.

Henniges, Current approaches of Wifi Positioning. Service-Centric Networking Seminar. WS2011/2012. 8 pages.

Henry et al., RGB-D mapping: Using Kinect-style depth cameras for dense 30 modeling of indoor environments. The International Journal of Robotics Research. Feb. 10, 2012. 26 pages. URL:http://citeseerx.ist.psu.edu/viewdoc/download?doi=10.1.1.480.160&rep=rep1&type=pdf [retrieved on Jan. 26, 2020].

Huang et al., Efficient, Generalized Indoor WiFi GraphSLAM. IEEE International Conference on Robotics and Automation. 2011. 3 pages. doi: 10.1109/ICRA.2011.5979643.

Ito et al., W-RGB-D: Floor-Plan-Based Indoor Global Localization Using a Depth Camera and WiFi. 2014 IEEE international conference on robotics and automation (ICRA). May 2014, pp. 417-422.

Kurz et al., Representative feature descriptor sets for robust handheld camera localization. 2012 IEEE International Symposium on Mixed and Augmented Reality (ISMAR). Nov. 5, 2012. pp. 65-70.

Larsson et al., Fine-grained segmentation networks: Self-supervised segmentation for improved long-term visual localization. arXiv:1908.06387v1. Aug. 18, 2019. 13 pages.

Lynen et al., Get Out of My Lab: Large-scale, Real-Time Visual-Inertial Localization. Robotics: Science and Systems. Jul. 2015. 10 pages.

Lynen et al., Large-scale, real-time visual-inertial localization revisited. arXiv preprint arXiv:1907.00338v1. Jun. 30, 2019. 21 pages.

Mirowski et al., Depth camera SLAM on a low-cost WiFi mapping robot. Apr. 2012. 7 pages. doi:10.1109/TePRA.2012.6215673.

Mohanna et al., Optimization of Music algorithm for angle of arrival estimation in wireless communications. NRIAG Journal of Astronomy and Geophysics. 2013:2:116-124.

Mueller, Fast In-memory spatial radius queries with Python. Aug. 9, 2017. 8 pages. URL:https://medium.com/@alexander.mueller/experiments-with-in-memory-spatial-radius--queries-in-python-e40c9e66cf63 [retrieved on Feb. 24, 2022].

Panzarino, What exactly WiFiSLAM is, and why Apple acquired it. Mar. 25, 2013. URL:https://thenextweb.com/apple/2013/03/26/what-exactly-wifislam-is-and-why-apple-acquired-it [retrieved Feb. 24, 2021].

Pertuz et al., Analysis of focus measure operators for shape-from-focus. Pattern Recognition. May 2013;46:1415-32.

Qi et al., Pointnet: Deep learning on point sets for 3d classification and segmentation. arXiv:1612.00593. Apr. 10, 2017. 19 pages.

Rabinovich et al., Lumin OS & Lumin SDK: past, present and future. Magic Leap, Inc. Apr. 2, 2019. URL:https://www.magicleap.com/en-us/news/product-updates/lumin-os-and-lumin-sdk-update [retrieved on Dec. 31, 2020]. 9 pages.

Snavely et al., Skeletal graphs for efficient structure from motion. IEEE Conference on Computer Vision and Pattern Recognition. Jun. 23, 2008. 11 pages. URL:http://www.cs.cornell.edu/~snavely/projects/skeletalset.

Stobing, How to Add Website Links to the Windows 10 Start Menu. Howtogeek.com. 2016. 9 pages. URL:https://www.howtogeek.com/237951/how-to-add-website-links-to-the-windows-10-start-menu [Last accessed Jul. 11, 2022].

Sturari et al., Robust and affordable retail customer profiling by vision and radio beacon sensor fusion. Pattern Recognition Letters. Oct. 1, 2016;81:30-40.

Sweeney et al., Efficient computation of absolute pose for gravity-aware augmented reality. 2015 IEEE International Symposium on Mixed and Augmented Reality (ISMAR). Sep. 29, 2015, pp. 19-24.

Taira et al., InLoc: Indoor visual localization with dense matching and view synthesis. Proceedings of the IEEE Conference on Computer Vision and Pattern Recognition. 2018. pp. 7199-7209.

Tang, Applying Deep Learning to Detect Blurry Images. Dec. 12, 2017. 6 pages. URL:https://tangming2008.github.io/neural network/tensor flow/classification/Applying-Deep--Learning-to-Detect-Blurry-Images/.

Velasquez et al., Cross Reality System With Accurate Shared Maps, U.S. Appl. No. 18/457,314, filed Aug. 28, 2023.

Vogt, Real-Time Augmented Reality for Image-Guided Interventions. Doctoral dissertation, Friedrich-Alexander-Universität Erlangen-Nürnberg (FAU). Feb. 18, 2009. 48 pages. URL:https://opus4.kobv.de/opus4-fau/files/1235/sebastianVogtDissertation.pdf.

Wikidan61, Normalization (image processing). Wikipedia. Apr. 23, 2018. 2 pages. URL:https://en.wikipedia.org/w/index.php?title=Normalization_(image_processing)&oldid=83785 6854 [retrieved on Jun. 16, 2023].

(56) References Cited

OTHER PUBLICATIONS

Willaredt, WiFi and Cell-ID based positioning—Protocols, Standards and Solutions. SNET Project WT. Jan. 26, 2011. 10 pages.
Xiong et al., A Diversified Generative Latent Variable Model for WiFi-SLAM. Proceedings of the Thirty-First AAAI Conference on Artificial Intelligence (AAAI-17). Feb. 2017;31:3841-3847.
Yi et al., Learning to find good correspondences. arXiv:1711.05971. May 21, 2018. 13 pages.
Zhang et al., Cross Reality System With Simplified Programming of Virtual Content, U.S. Appl. No. 18/353,775, filed Jul. 17, 2023.
Zhao et al., Cross Reality System With Prioritization of Geolocation Information for Localization, U.S. Appl. No. 18/510,623, filed Nov. 15, 2023.
[No Author Listed], Sony Releases the Transparent Lens Eyewear "SmartEyeglass Developer Edition". Feb. 17, 2015. 5 pages. URL:https://www.sony.com/en/SonyInfo/News/Press/201502/15-016E [retrieved on Aug. 8, 2023].
[No Author Listed], Wearable Tech 2013: Vuzix reveals Waveguide optics engine for smart glasses. Dec. 12, 2013. 2 pages. URL:https://www.novuslight.com/wearable-tech-2013-vuzix-reveals-waveguide-optics-engine-for-smart-glasses_N1972.html [retrieved on Aug. 8, 2023].
Burke, The History of Virtual Reality & The Future: Rift, Omni, STEM, castAR. Gamers Nexus. Oct. 20, 2013. 5 pages. URL:https://www.gamersnexus.net/guides/1208-history-of-virtual-reality-and-future?showall=1 [retrieved on Aug. 8, 2023].
Carmigniani et al., Augmented reality technologies, systems and applications. Multimedia tools and applications. Jan. 2011;51:341-77.
Gabbard, Declaration under Under 37 CFR Section 1.132 including Appendix A (List of Materials Considered) and Appendix B (Curriculum Vitae) and Incorporated Claim Charts. Apr. 11, 2024. 132 pages.
Holliman et al., Three-dimensional displays: a review and applications analysis. IEEE transactions on Broadcasting. Jun. 2011;57(2):362-71.
Kaneto et al., Space-sharing AR interaction on multiple mobile devices with a depth camera. 2016 IEEE Virtual Reality (VR). Mar. 2016. pp. 197-198. DOI: 10.1109/VR.2016.7504721.
Lavalle et al., Head Tracking for the Oculus Rift. Sep. 2014. ISBN 978-1-4799-3685-4. 8 pages.
Liu et al., VSLAM of Autonomous UAV Based on ROS. Modern Defense Technology. Dec. 2016;44(6):61-66.
Mendes et al, A survey on 3D virtual object manipulation: From the desktop to immersive virtual environments. Submitted to Computer Graphics Forum. Apr. 2018. 25 pages.
Monasse et al., Epipolar rectification. Oct. 30, 2010. 26 pages.
Shahrokni et al., Cross Reality System With Quality Information About Persistent Coordinate Frames, U.S. Appl. No. 18/780,769, filed Jul. 23, 2024.
Sonka et al., Image processing, analysis and machine vision. Fourth Edition. Cengage Learning. 2013. 930 pages.
Sprague, Coordinate Frames. 2016. 10 pages.
Sturm, A historical survey of geometric computer vision. International Conference on Computer Analysis of Images and Patterns. Aug. 2011, pp. 1-8. Berlin, Heidelberg: Springer Berlin Heidelberg.
Wagemaker, Calibration Methods for Head-Tracked 3D Displays. Thesis Submitted to University of Saskatchewan. Dec. 2017. 106 pages.

\* cited by examiner

RENDERING LOCATION SPECIFIC VIRTUAL CONTENT IN ANY LOCATION

CROSS-REFERENCE TO RELATED APPLICATIONS

This application is a continuation of U.S. patent application Ser. No. 17/547,773, filed on Dec. 10, 2021, entitled "RENDERING LOCATION SPECIFIC VIRTUAL CONTENT IN ANY LOCATION," which is a continuation of U.S. patent application Ser. No. 16/593,227, filed on Oct. 4, 2019, entitled "RENDERING LOCATION SPECIFIC VIRTUAL CONTENT IN ANY LOCATION," which claims the benefit under 35 U.S.C. § 119(e) of U.S. Provisional Patent Application Ser. No. 62/742,061, filed on Oct. 5, 2018, entitled "RENDERING LOCATION SPECIFIC VIRTUAL CONTENT IN ANY LOCATION." The contents of these applications are incorporated herein by reference in their entirety.

FIELD

The present disclosure relates to virtual reality and augmented reality imaging and visualization systems and more particularly to automatically repositioning a virtual object in a three-dimensional (3D) space.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of an augmented reality system for rendering virtual content in any location are described.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
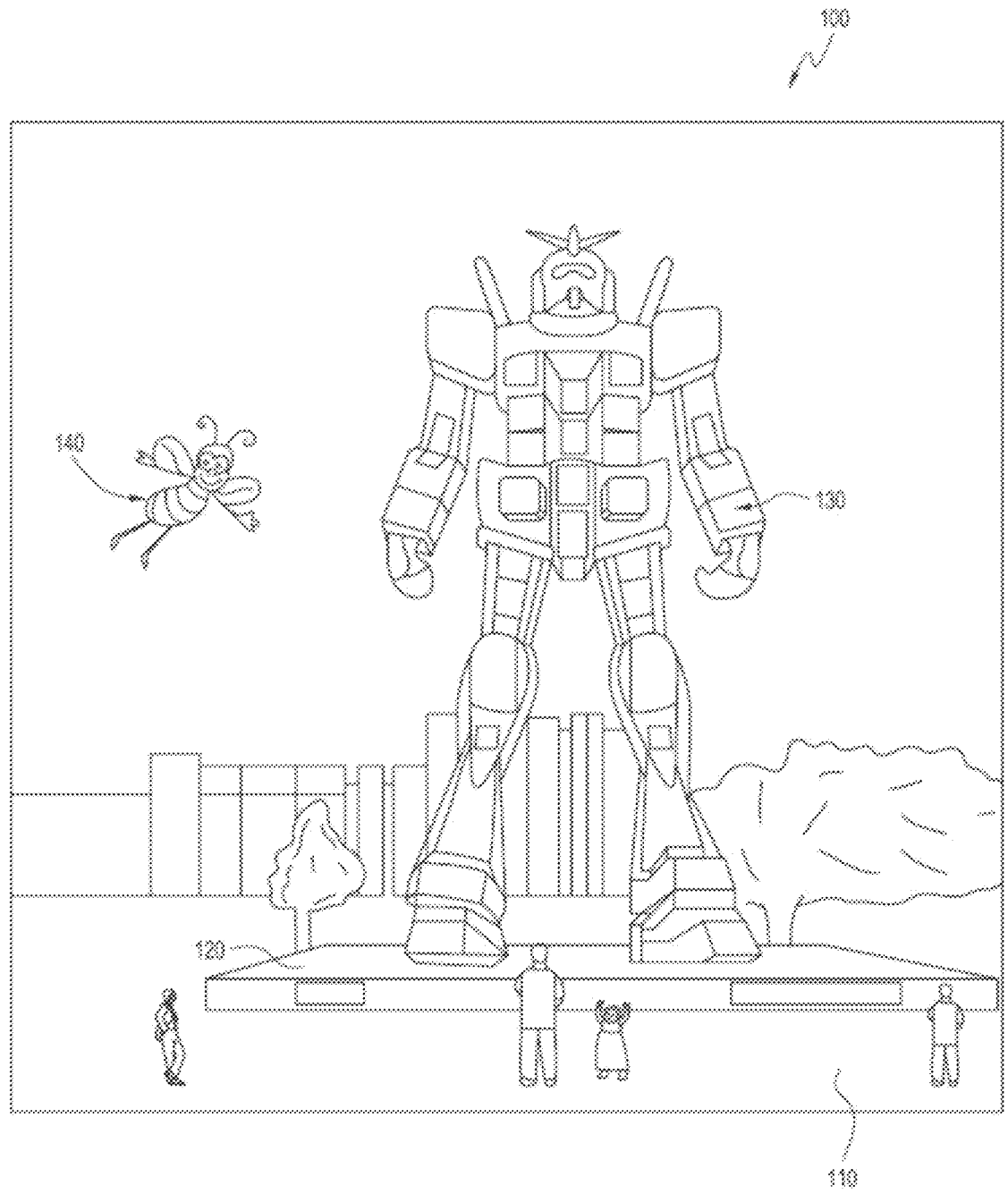
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In an AR/MR environment, a user may want to create, build, and/or design new virtual objects. A user may be an engineer who needs to create a prototype for a work project, or the user may be a teenager in high school who enjoys building and creating for fun, such as a person might build with physical elements in complex LEGO® kits and puzzles. In some situations, the user may need to build virtual objects with complex structures that may take a while to build, over the course of several days, months, or even years, for example. In some embodiments, the virtual objects with complex structures may comprise repeating components arranged or used in different ways. As a result, there are situations in which a user may wish to build components, sometimes from pre-built sub-components, and save one or more of the built components as separate saved scenes, and then build various designs utilizing the one or more previously saved scenes.

For example, the user may wish to create a landscape design utilizing the AR/MR wearable device. The wearable device may have an application downloaded that stores or can access pre-built sub-components, such as various types of trees (e.g. pine tree, oak tree), flowers (e.g. gladiolas, sunflowers, etc.), and various other plants (e.g. bushes, vines, etc.). The landscape designer may realize through experience that certain plants go well together. The landscape designer may utilize the application on the AR/MR wearable device to create built components comprising these known preferred combinations of plants. As one example, a built component may comprise raspberry plants, tulip plants, and clover, for example, or any other suitable companion plant arrangement. After saving one or more scenes comprising one or more pre-fabricated sub-components combined to form one or more built components, the landscape designer may then wish to create a full landscape design for his/her home. The landscape design may comprise one or more saved scenes and/or one or more built components, and/or one or more pre-built sub-components. The landscape design may be designed more quickly and easily by utilizing saved scenes, than if the landscape designer had started with only pre-built sub-components.

Saved scenes may also allow for more flexible design options. For example, some applications may only enable the user to choose from pre-built sub-components which may be more or less complex than the designer needs. The ability to save built components may enable the original downloaded application to be smaller in size than an application that does not enable saving built components because fewer pre-built sub-components may be required.

In some embodiments, the application may enable the user to create a design in one location and then re-open the saved design at the exact same location at a later time. In some embodiments, the application may enable the user to create a design in one location and then re-open the saved design at any other location in the real world. For example, this may enable the user to create a design in his/her office and then re-open the design for presentation during a meeting in a meeting room.

However, some applications may only enable re-opening a saved design at a specific location in the real world, which may be a problem for the user who may create a design in the user's office but needs to share the design in a meeting room. In systems that only enable re-opening a saved design at a specific location, if the real world location is no longer available (e.g. the user's office building burns down), the saved design is no longer accessible because it depends on that particular location (for example it may comprise objects digitally anchored or placed relative to real world objects that do not exist at the second location or have differing characteristics). Additionally, systems that only enable the user to re-open a saved design once per session or once per room, for example, may not meet the user's need. For example, a user may wish to present the user's design during a meeting from several perspectives simultaneously, and thus may wish to load multiple copies of the saved design into the meeting room.

The systems and methods of the present application solve these problems. Such a system, for example, may enable a user to specify virtual content based on what the user perceives in an augmented reality environment. The system may then save a digital representation of that virtual content as a scene. At a later time, a user may instruct the same, or possibly a different, augmented reality system to open the saved scene. That augmented reality system may, as part of opening the saved scene, incorporate virtual content of the saved scene into a mixed reality environment for the user of the augmented reality system such that the user for whom the scene is opened may then perceive the virtual content.

A scene, in some embodiments, may be assembled from multiple built components, which may be built by specifying combinations of pre-built subcomponents. The built components may be of any complexity, and may even be, for example, scenes that were previously saved. Further, the built components need not be assembled from pre-built subcomponents. Components also may be built using tools supplied by the augmented reality system. As one example, the system may process data about a physical object collected with sensors of the augmented reality system to form a digital representation of that physical object. This digital representation may be used to render a representation of the physical object, thus serving as a virtual object. Further, it is not a requirement that the scene to be saved have multiple built components or even multiple pre-built sub-components. The scene may have a single component. Thus, it should be understood that description of saving or opening a scene refers to manipulation of virtual content of any level of complexity and from any source.

A saved scene may comprise at least one saved scene anchor node (e.g. a parent node in a hierarchical data structure that may represent the saved scene at a coordinate system in space) for the saved scene. Virtual content of the scene may have an established spatial relationship with respect to the saved scene anchor node such that, once the location of the saved scene anchor node is established in an environment of a user of an augmented reality system, the location within that environment of the virtual content of the scene can be determined by the system. Using this location information, the system may render the virtual content of the scene to that user. The location of the virtual content of the saved scene within the environment of a user of an augmented reality system may be determined, for example, by user input positioning a visual anchor node, representing a location within the environment of the user. A user may manipulate the location of the visual anchor node through a virtual user interface of the augmented reality system. The virtual content of the saved scene may be rendered with the saved scene anchor node aligned with the visual anchor node.

In some scenarios, the saved scene anchor node may correspond to a fixed location in the physical world, and the saved scene may be re-opened with the virtual content of the scene having the same position relative to that location that it had upon saving of the scene. In that case a user may experience the scene if that fixed location in the physical world is within the user's environment when the scene is opened. In such a scenario, the saved scene anchor node may comprise a persistent coordinate frame (PCF), which may be a point with a coordinate frame that is derived from objects that exist in the real world that do not change, much, at all, or infrequently, over time. This location associated with the saved scene anchor node may be represented by a saved PCF. The saved PCF may be utilized to re-open the saved scene such that the saved scene is rendered at the exact same location in space where the saved scene was rendered when it was saved.

Alternatively, the location in the physical world at which an augmented reality system may render content of a saved scene to a user may not be fixed. The location may be dependent on user input or on the user's surroundings when the scene is opened. For example, if the user needs to open the saved scene at a different location, the user is able to do so by utilizing an adjustable visual anchor node or nodes as appropriate.

Alternatively or additionally, the system may conditionally position the virtual content of the saved scene in a fixed location, if the saved scene is re-opened for a user while that fixed location is within their environment or within their field of view. If not, the system may provide a user interface through which the user may provide input indicating the location in which the virtual content of the saved scene is to be located. The system may accomplish this by identifying the PCF closest to the user (current PCF). If the current PCF matches the saved PCF, the system may re-open the saved scene with the virtual content of the saved scene at the exact same location as when the saved scene was saved by placing the virtual objects of the saved scene at a fixed spatial configuration relative to the PCF. If the current PCF does not match the saved PCF, the system may preview place the saved scene at a default location or at a location chosen by the user. Based on the preview placement, the user or system may move the entire saved scene to a desired location, and tell the system to instantiate the scene. In some embodiments, the saved scene may be rendered at the default location in a preview format, lacking some details or functions of the saved scene. Instantiating a scene may comprise rendering the full saved scene to the user including all visual, physics, and other saved scene data.

One skilled in the art may approach the problem of saving scenes by creating a process for saving built sub-components and a separate process for saving scenes. Exemplary systems as described in the present application may merge the two processes and provide a single user interaction. This has a computer operational benefit. For example, writing and managing a single process instead of two processes may improve reliability. Additionally, the processor may be able to operate faster because the processor only needs to access one program instead of accessing and switching between two or more processes. Additionally, there may be a usability benefit to the user in that the user only needs to learn one interaction instead of two or more.

If the user wishes to view several virtual objects in one room without saving the scene, for example 20 different virtual objects in the user's office, the system would need to track the 20 different object locations relative to the real world. One benefit of the systems and methods of the present application, is that all 20 virtual objects may be saved into a single scene, where only a single saved scene anchor node (e.g. PCF) would need to be tracked (20 objects would be placed relative to the PCF, not relative to the world, which may require less compute). This may have the computer operational benefit of less computation, which may lead to less battery use or less heat generated during processing, and/or may enable the application to run on a smaller processor.

The systems and methods disclosed may enable a simple, easy, unified user experience for saving and/or re-opening a scene within an application by creating a single user interaction in each of multiple different situations. Re-opening a scene may comprise loading and/or instantiating a scene. Three examples of situations in which a user may re-open a scene with the same interaction are: In Situation 1, the user may wish to re-open a saved scene to appear in the exact same location and environment in which the scene was saved (e.g. the saved PCF matches the current PCF). In Situation 2, the user may wish to re-open a saved scene to appear in the exact same location in which the scene was saved, but with the environment different (e.g. saved PCF matches the current PCF, but the digital mesh describing the physical environment has changed). For example, the user may save and re-open a saved scene in the user's office at work, but the user may have added an extra table to the office. In Situation 3, the user may wish to re-open a saved scene to appear at a different location comprising a different environment than the scene was saved (e.g. saved PCF does not match current PCF, saved world mesh does not match current world mesh).

Regardless of the situation, the user may interact with the system through the same user interface, with controls that are available in each of multiple situations. The user interface may be, for example, a graphical user interface in which controls are associated with icons visible to the user and the user activates a control by taking an action that indicates selection of an icon. In order to save a scene, for example, the user may select a camera icon (1900, FIG. 19), frame the scene, and then capture the image.

Figure 19:
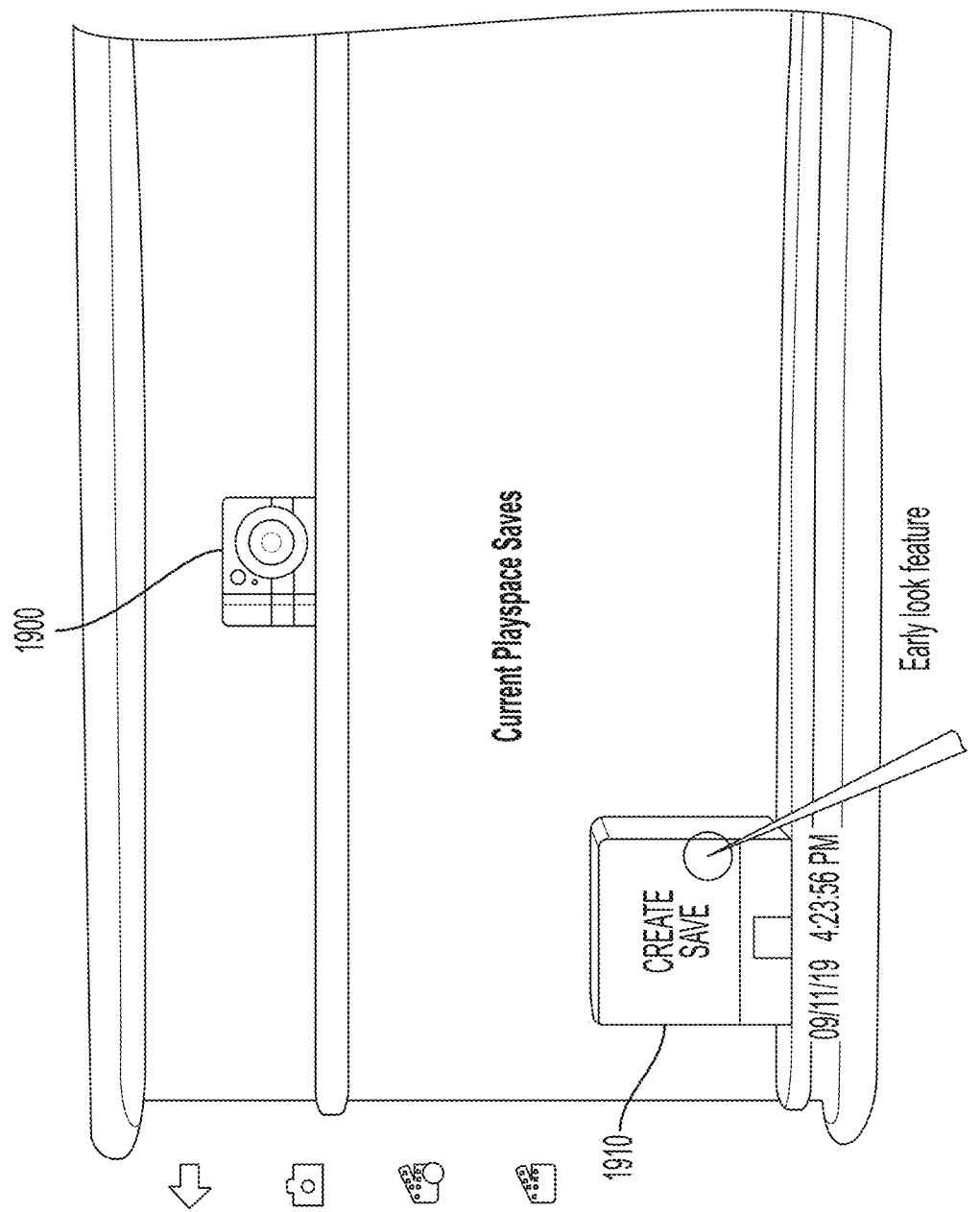
FIG. 19 is a sketch of an exemplary user interface presenting to a user of an augmented reality system an icon for selecting a virtual camera and a menu of saved scenes available to be opened in the user's environment.
Figure 20:
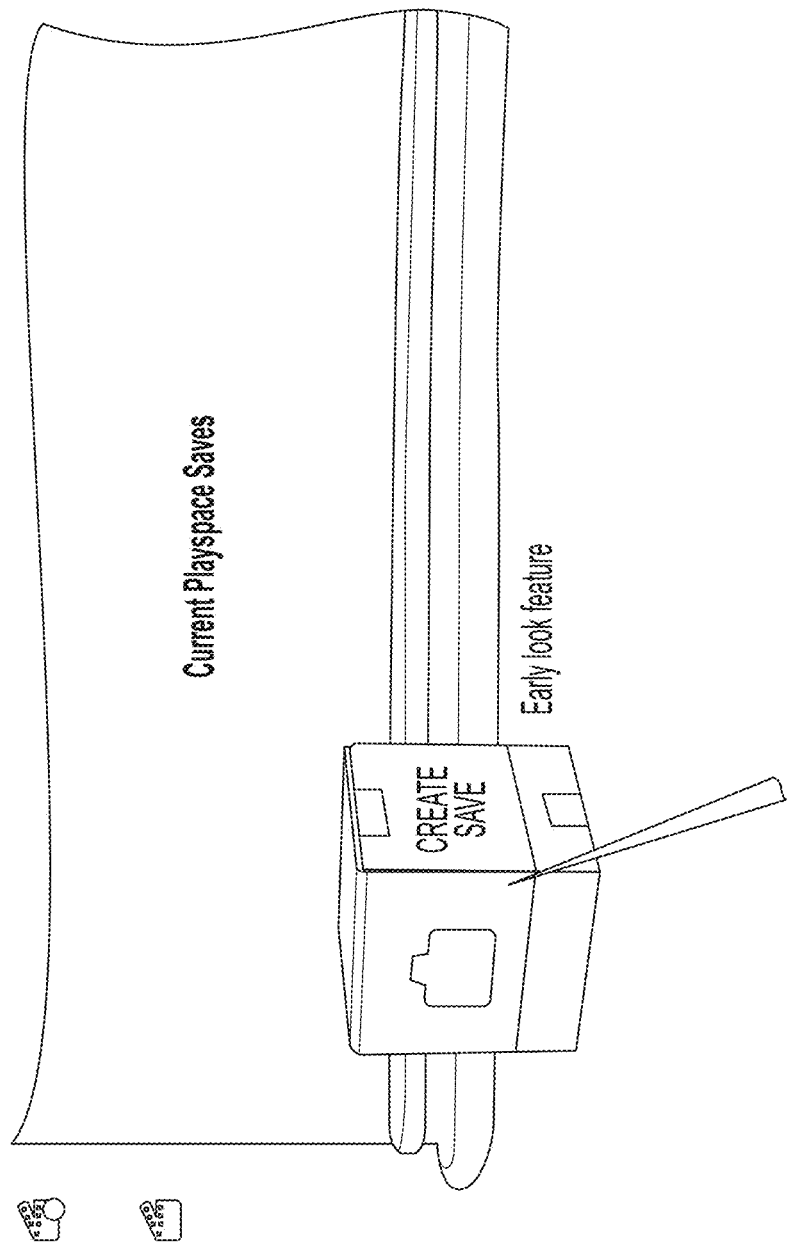
FIG. 20 is a sketch of a portion of the exemplary user interface of FIG. 19 illustrating the user moving a selected saved scene icon from the menu.

Regardless of the situation, in order to load a scene, the user may, for example, select a saved scene icon, such as icon 1910 (FIG. 19). The user may pull the saved scene icon out of a user menu (which may create a preview of the saved scene), an example of which is illustrated in FIGS. 19 and 20. The user may then release the saved scene icon (which may place a visual anchor node relative to the saved scene objects). The user may optionally move the visual anchor node in order to move the saved scene relative to the real world, and then instantiate the scene (which may send full saved scene data into the render pipeline).

One skilled in the art may approach the three situations as three different problems and would create three separate solutions (e.g. programs) and user interactions to address those problems. The systems and methods of the present application solve these three problems with a single program. This has a computer operational benefit. For example, writing and managing a single process instead of two processes improves reliability. Additionally, the processor is able to operate faster because the processor only needs to access one program instead of switching between multiple processes. An additional computer operational benefit is provided because the system only needs to track a single point in the real world (e.g. the anchor node).

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario, as viewed by a person using an MR system, with certain virtual reality objects and certain physical objects. FIG. 1, depicts an MR scene 100 in which a user of an MR technology sees a real-world, park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
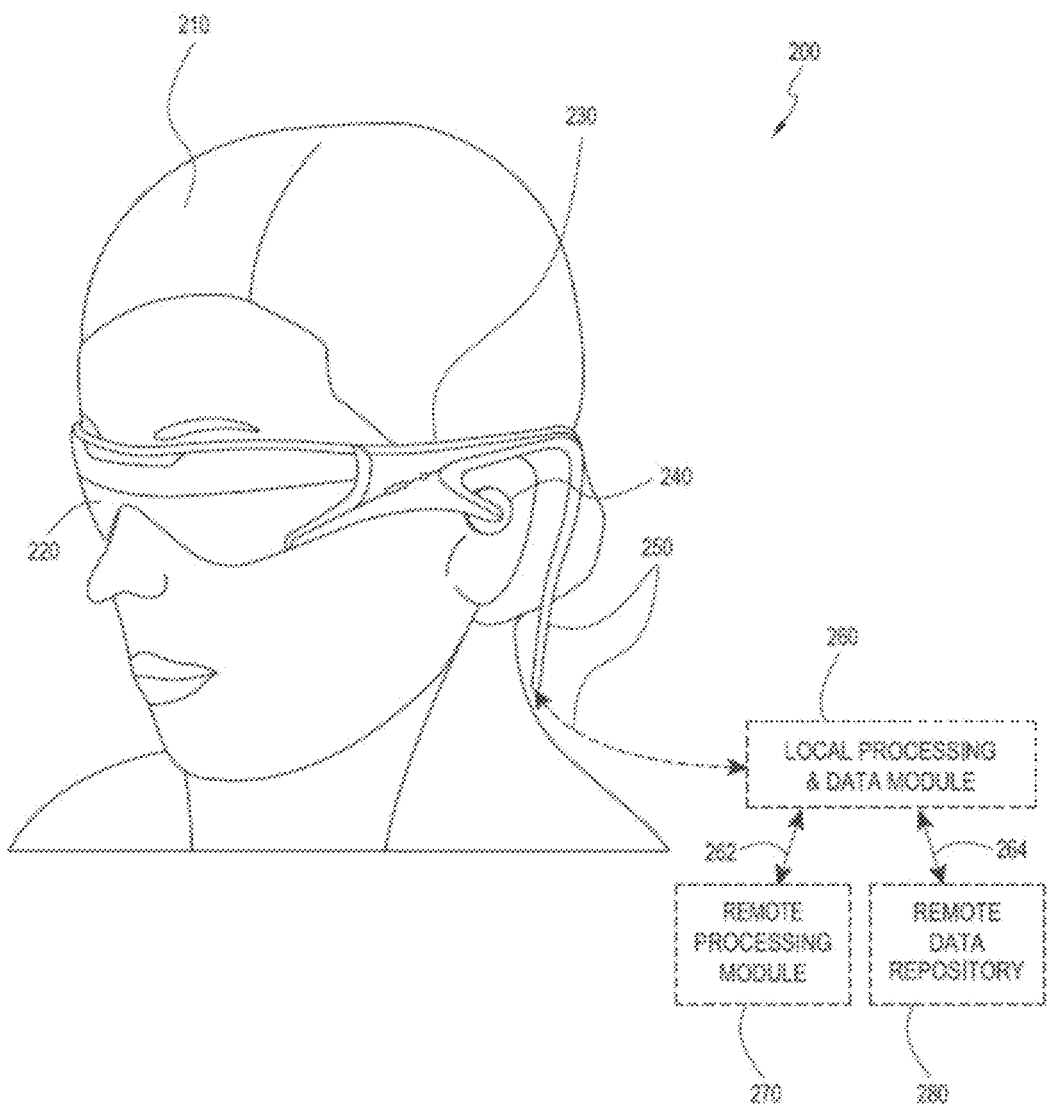
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) for detecting an audio stream from the environment on which to perform voice recognition.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images that reveal a pose of the user. The images may be still images, frames of a video, or a video, or any combination of such sources of information or other like sources of information.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by any particular theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
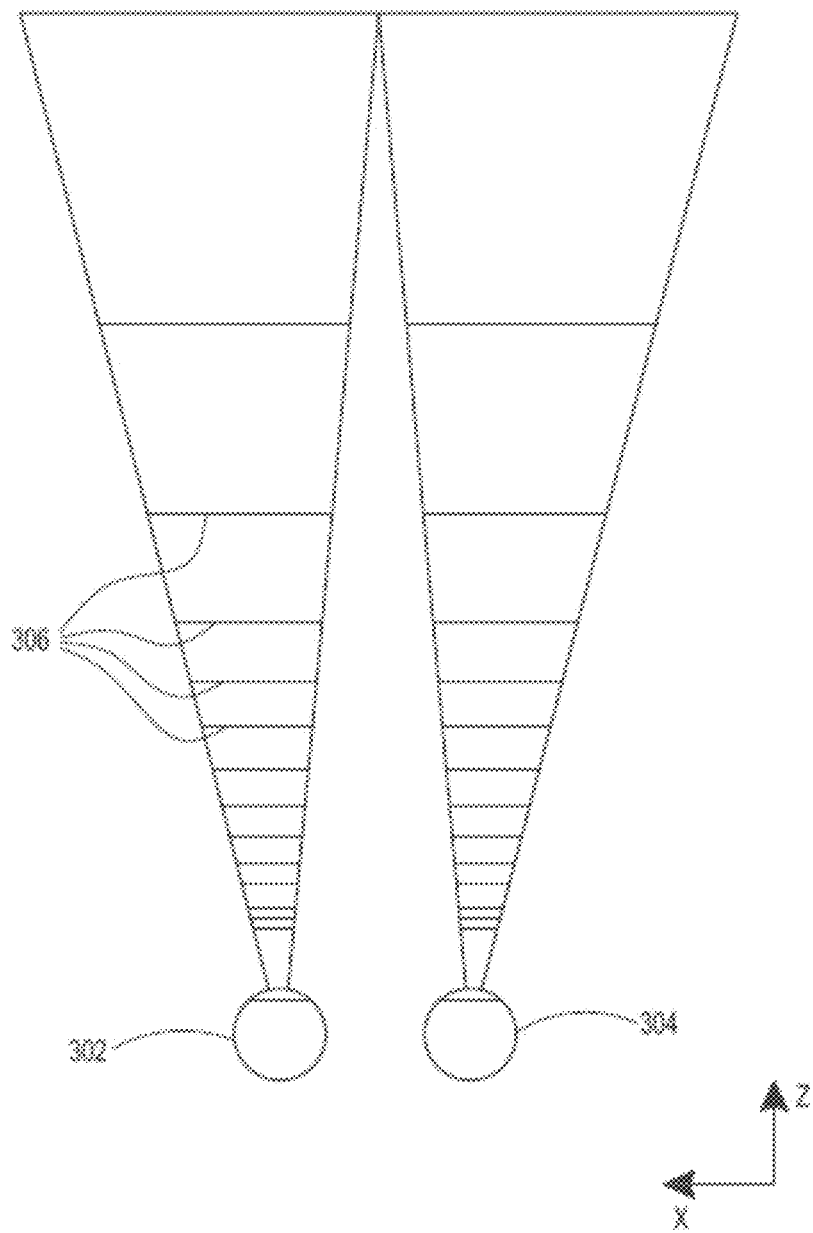
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
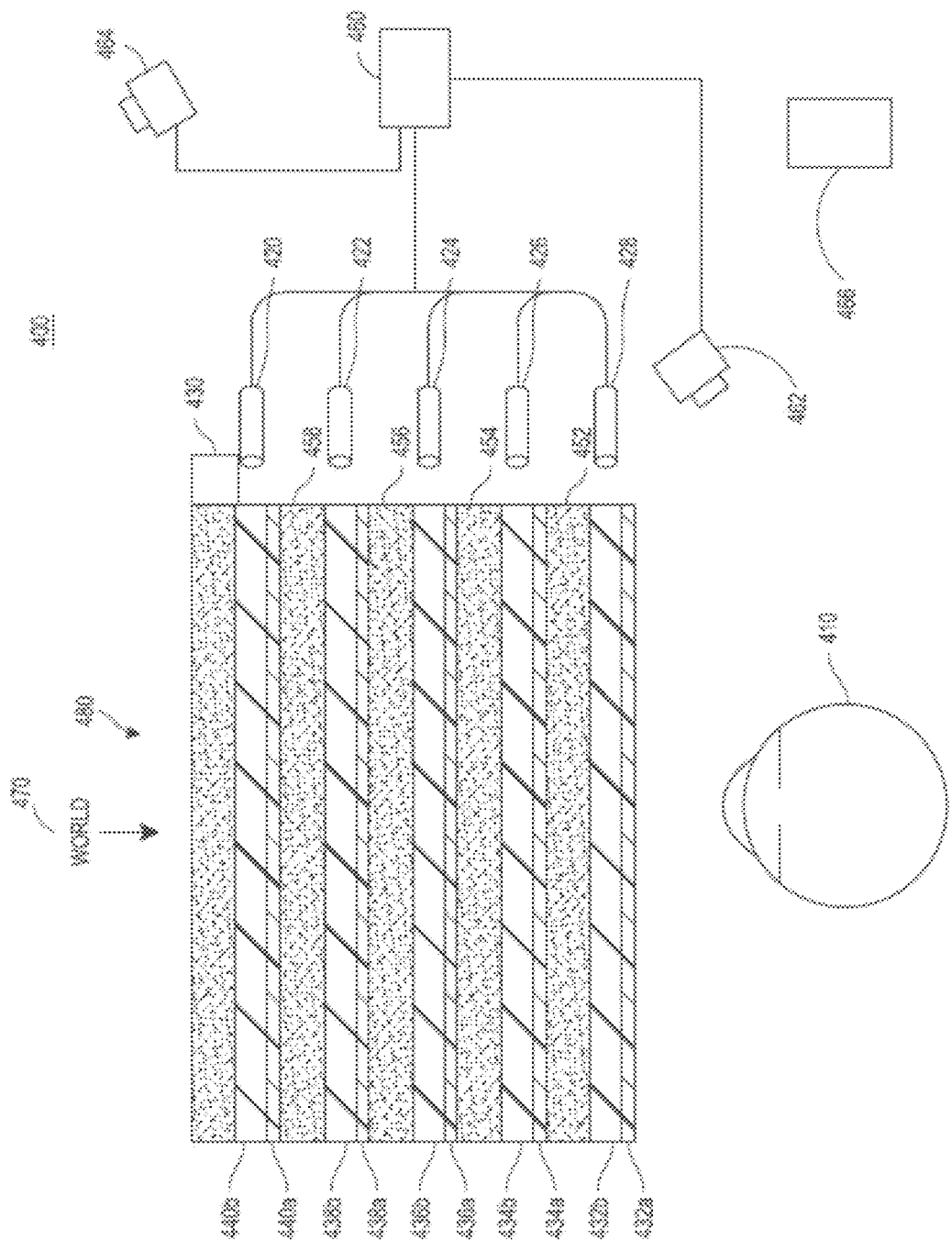
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem, a component that senses movements of the user recognized by the system as inputs (e.g. a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
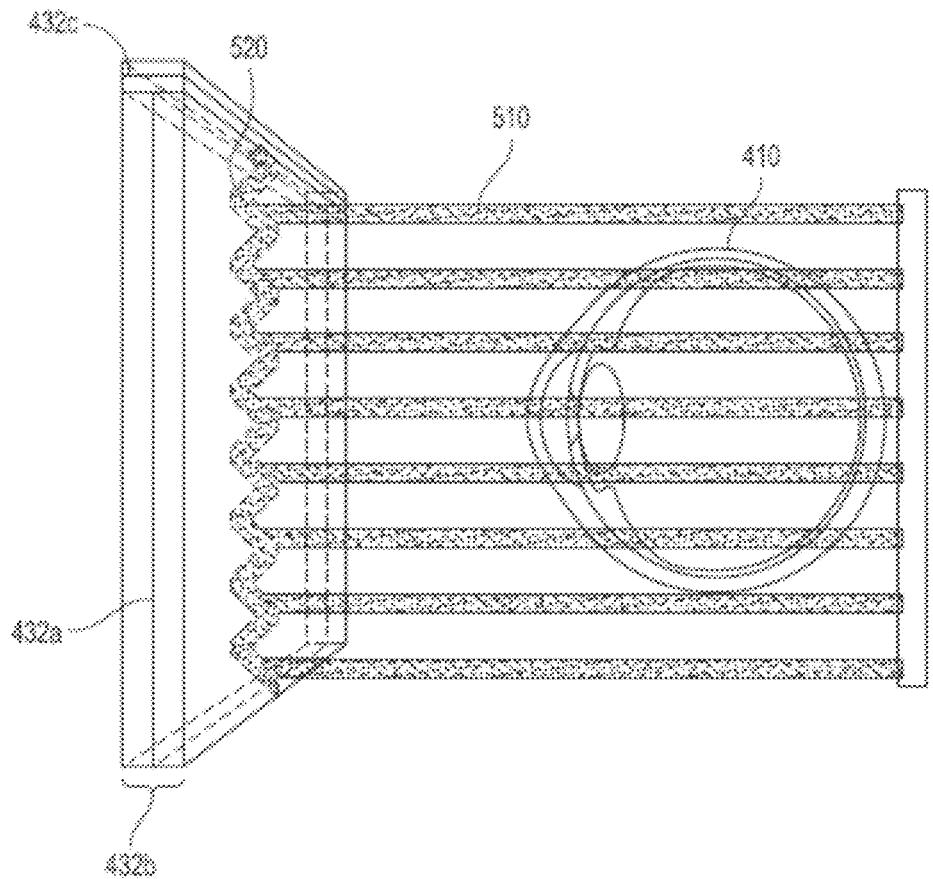
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
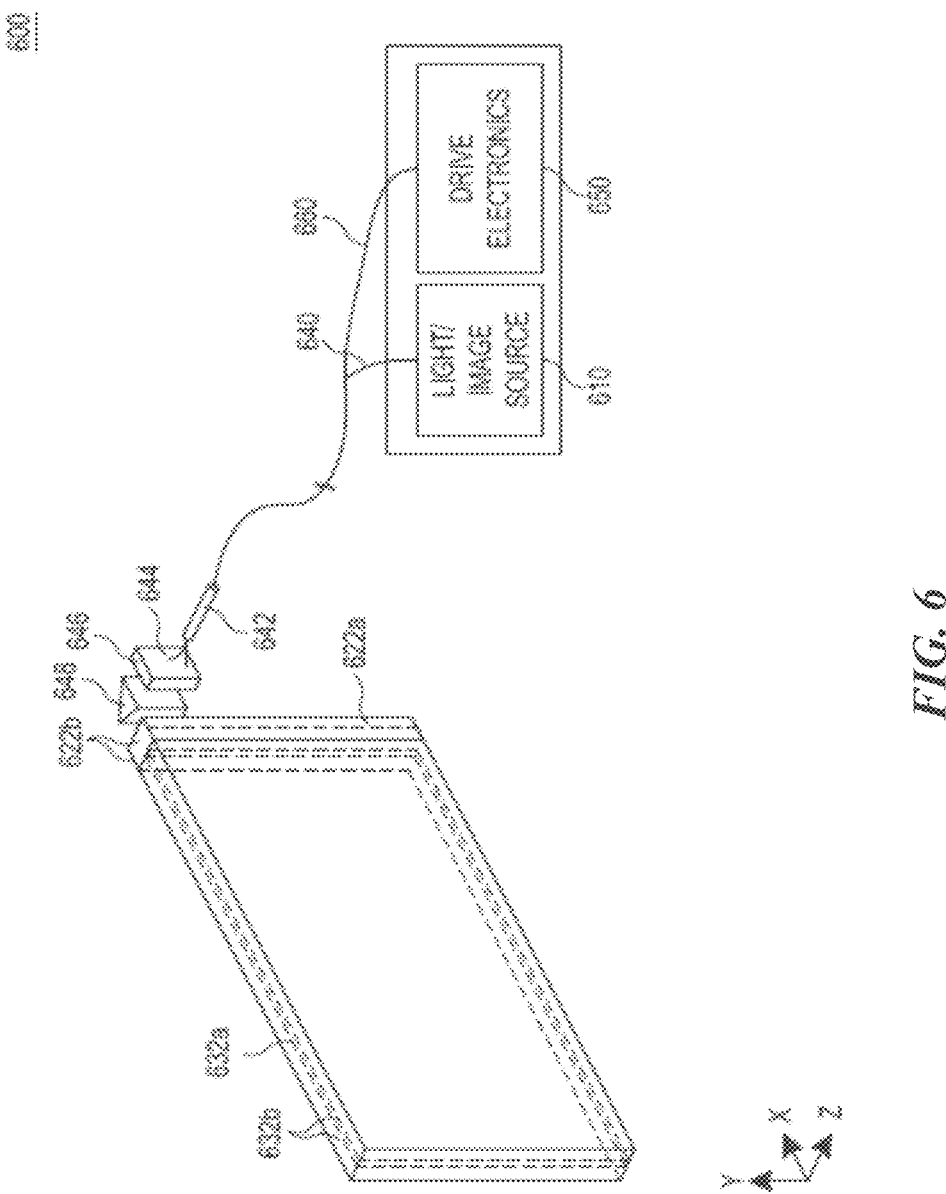
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured during operation to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchball, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
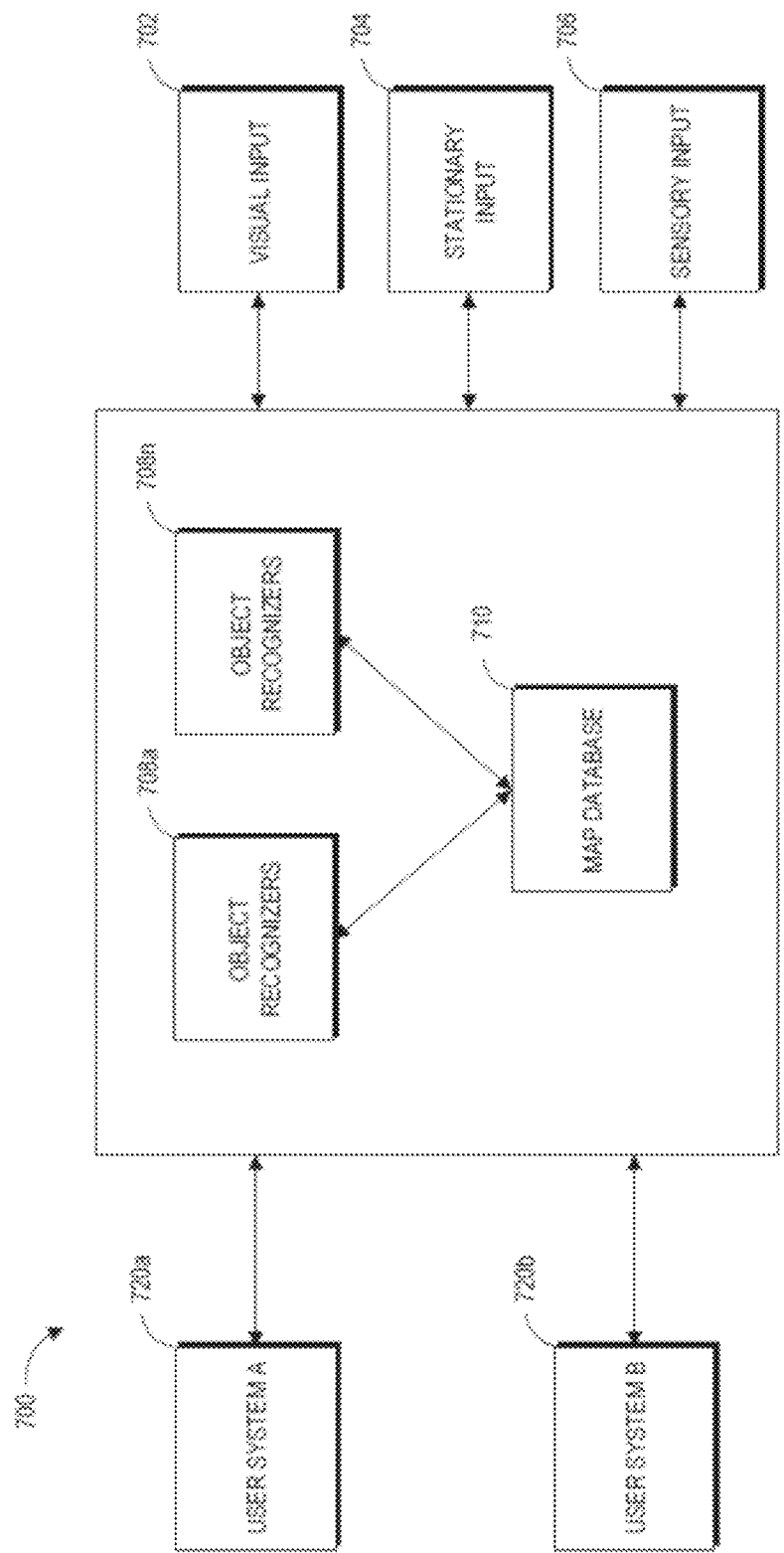
FIG. 7 is a block diagram of an example of a wearable system.

FIG. 7 is a block diagram of an example of an MR system 700 operable to process data related to an MR environment, such as a room. The MR system 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a . . . 708n (of which only object recognizers 708a and 708n are shown for simplicity) may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for objects with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in a telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a minor, the system may attach semantic information that the minor has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR system 700 may include information about a scene happening in California. The information about the scene may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
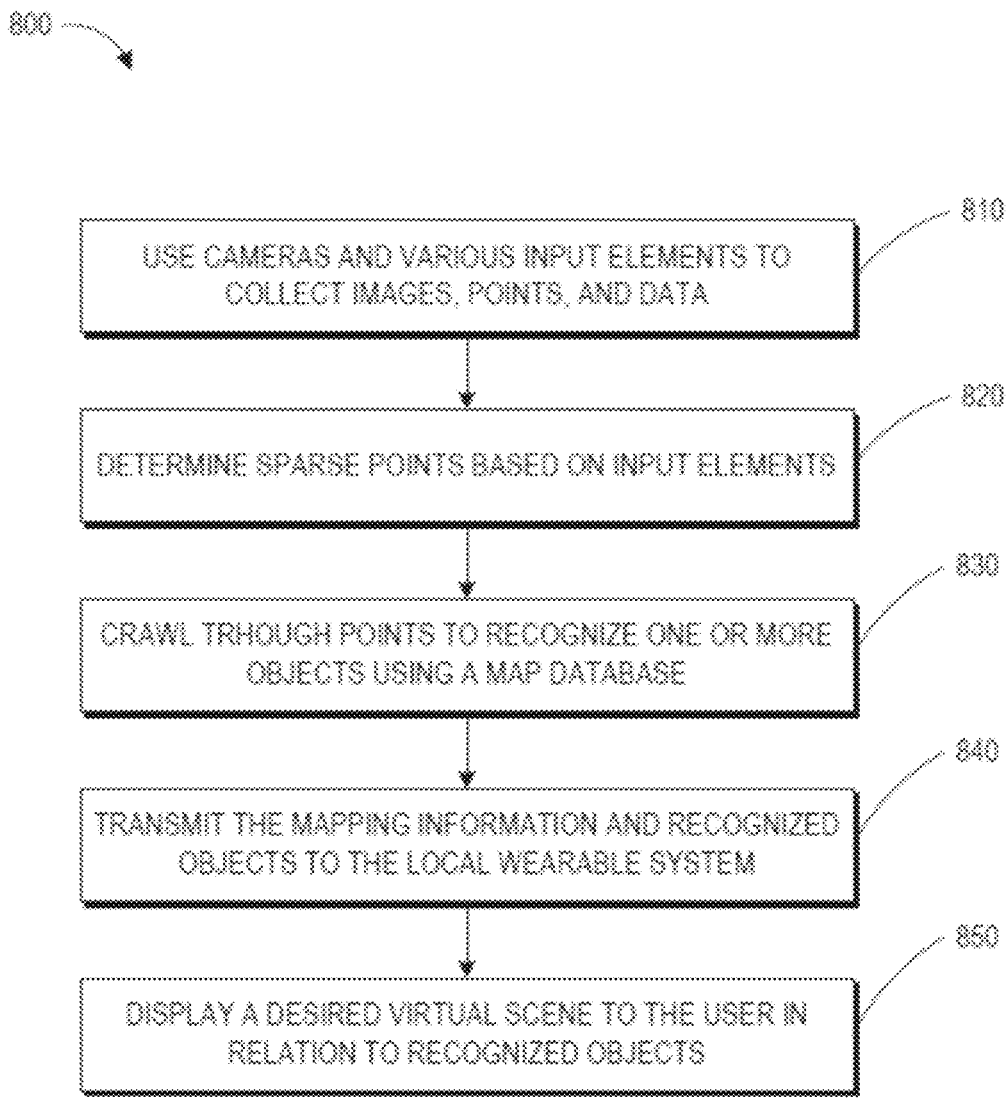
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
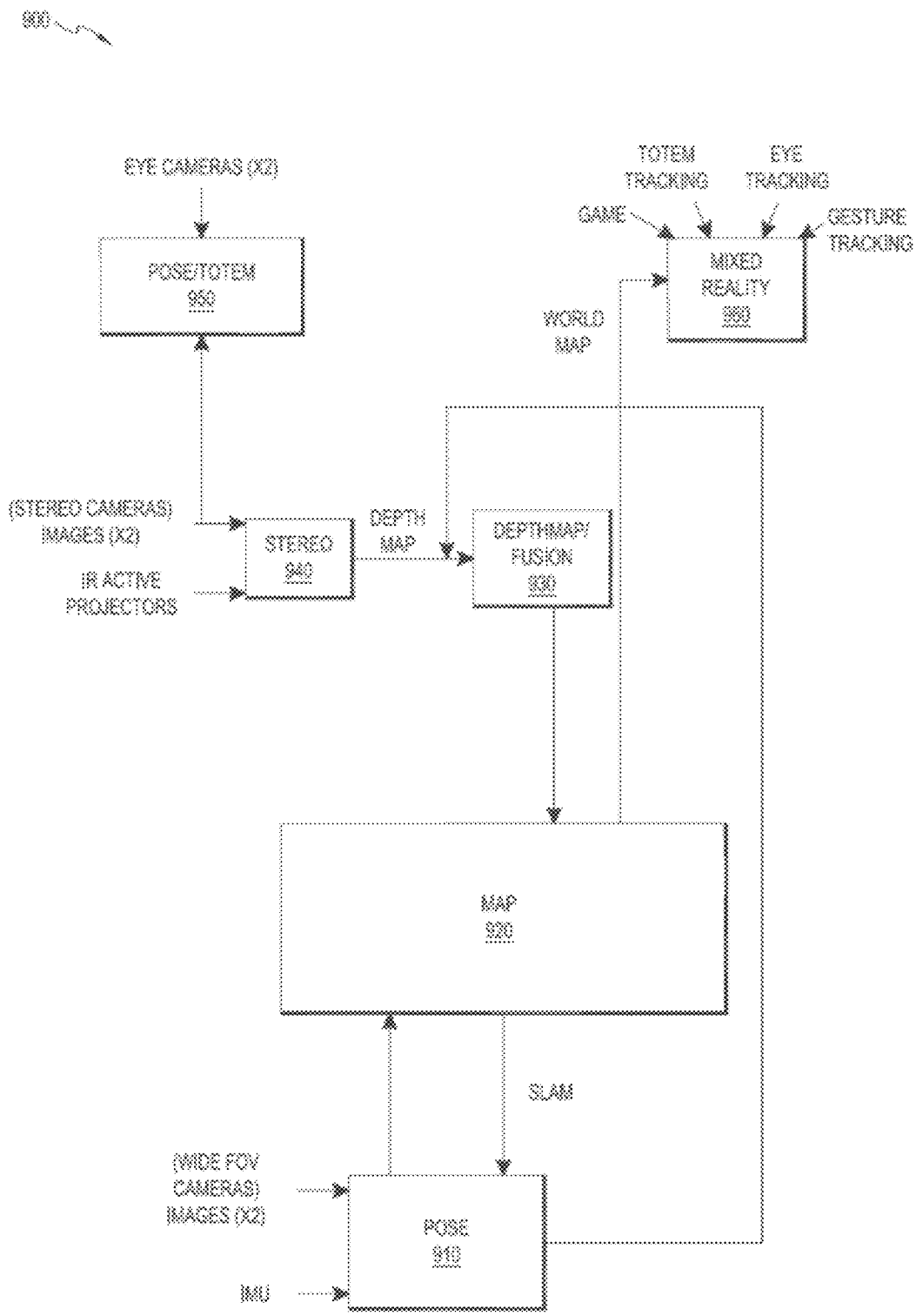
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 950 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Voice recognition can be another input, which can be used alone or in combination with other inputs (e.g., totem tracking, eye tracking, gesture tracking, etc.). The system 900 can include an audio sensor (e.g., a microphone) that receives an audio stream from the environment. The received audio stream can be processed (e.g., by processing modules 260, 270 or central server 1650) to recognize a user's voice (from other voices or background audio), to extract commands, parameters, etc. from the audio stream. For example, the system 900 may identify from an audio stream that the phrase "show me your identification" was said, identify that this phrase was said by the wearer of the system 900 (e.g., a security inspector rather than another person in the inspector's environment), and extract from the phrase and the context of the situation (e.g., a security checkpoint) that there is an executable command to be performed (e.g., computer vision analysis of something in the wearer's FOV) and an object for which the command is to be performed on ("your identification"). The system 900 can incorporate speaker recognition technology to determine who is speaking (e.g., whether the speech is from the wearer of the ARD or another person or voice (e.g., a recorded voice transmitted by a loudspeaker in the environment)) as well as speech recognition technology to determine what is being said. Voice recognition techniques can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
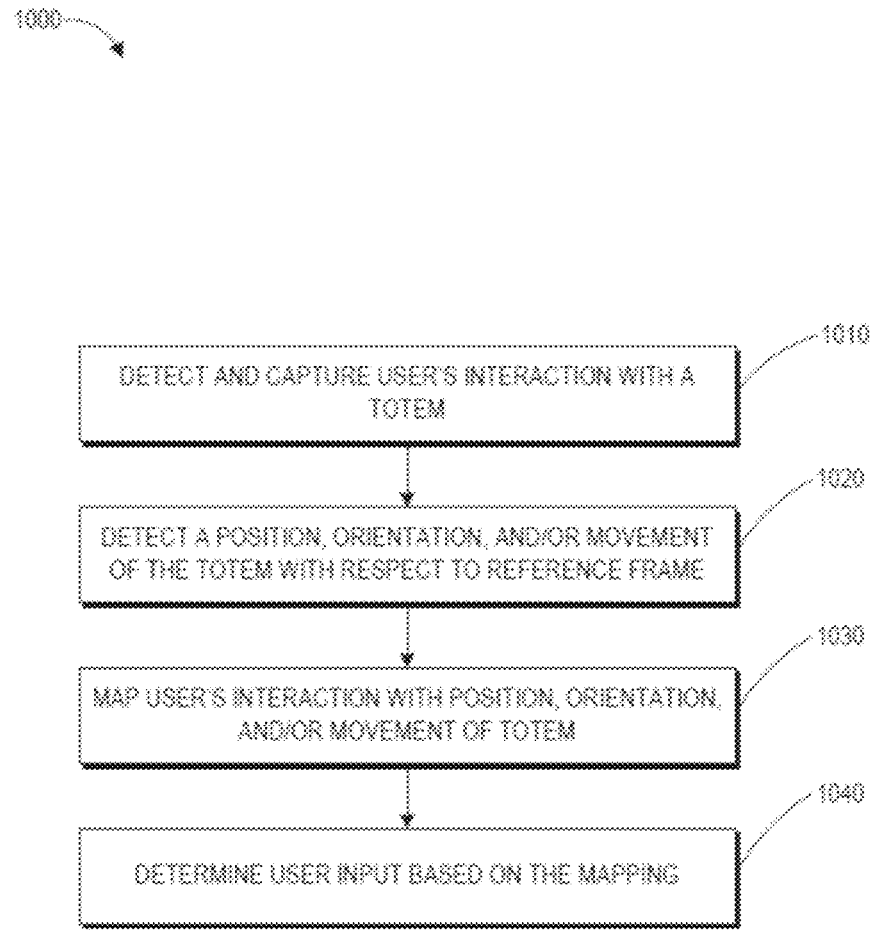
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
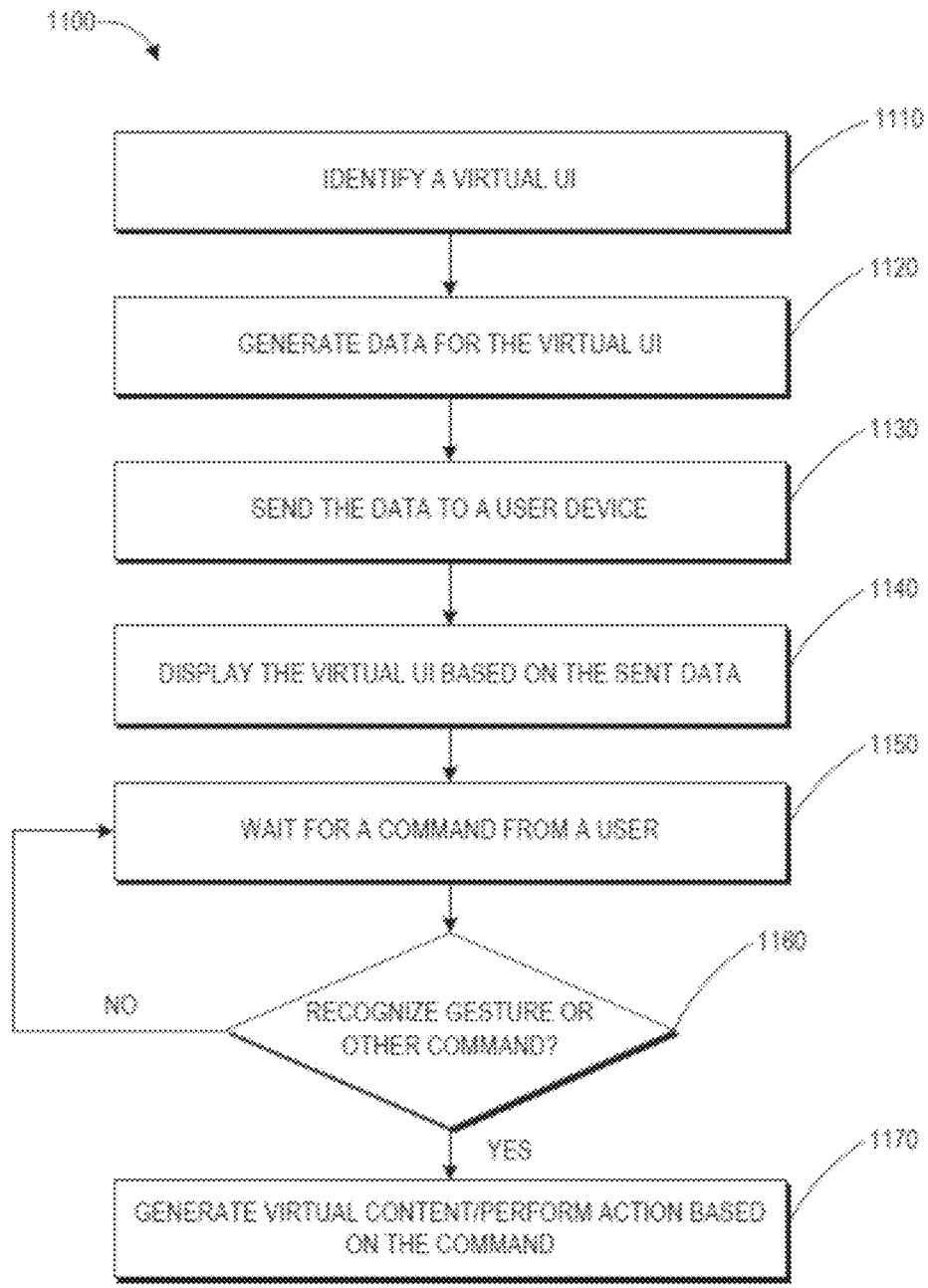
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario, for example, where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Persistent Coordinate Frame(s)

In some embodiments, the wearable system may store one or more persistent coordinate frames (PCF) within a map database, such as map database 710. A PCF may be built around points in space in the real world (e.g. the user's physical environment) that do not change over time. In some embodiments, a PCF may be built around points in space that do not change frequently over time, or are unlikely to change over time. For example, a point on a building is less likely to change location over time than a point on a car since most buildings are designed to stay in one location but a car is designed to move people and things from one location to another.

A PCF may provide a mechanism to specify locations. In some embodiments, a PCF may be represented as a point with a coordinate system. The PCF coordinate system may be fixed in the real world and may not change from session to session (i.e. when the user turns the system off and then on again).

In some embodiments, the PCF coordinate system may align with a local coordinate frame, which may be an arbitrary point in space chosen by the system at the beginning of a user session such that the PCF only lasts for the duration of a session. Such a PCF may be utilized for user pose determination.

The PCF may be recorded in a map database, such as map database 710. In some embodiments, the system determines one or more PCFs and stores the PCF in a map, such as a digital map of the real world (which may be implemented in the systems described herein as a "world mesh"). In some embodiments, the system may choose a PCF by looking for features, points, and/or objects that are invariant over time. In some embodiments, the system may choose a PCF by looking for features, points, objects, etc. that do not change between user sessions on the system. The system may utilize one or more computer vision algorithms, optionally in combination with other rule-based algorithms, that look for one or more of the features described above. Examples of computer vision algorithms are described above in context of object recognition. In some embodiments, the PCF may be a system level determination that multiple applications or other system processes may utilize. In some embodiments, the PCF may be determined at the application level. Accordingly, it should be appreciated that a PCF may be represented in any of multiple ways, such as a collection of one or more points or features recognizable in sensor data representing the physical world around a wearable system.

World Mesh 3D reconstruction is a 3D computer vision technique that takes images (e.g., colored/gray scale images, depth images, or the like) as inputs and generates 3D meshes (e.g., automatically) representing an observed scene, such as the user's environment and/or the real world. In some embodiments, the 3D mesh representing an observed scene may be called a world mesh. 3D reconstruction has many applications in virtual reality, mapping, robotics, game, filmmaking, and so forth.

As an example, a 3D reconstruction algorithm can receive input images (e.g., colored/gray scale images, colored/gray scale images+depth images, or depth-only) and, as appropriate, process the input images to form captured depth maps. For example, passive depth maps can be generated using multi-view stereo algorithm from colored images, and active depth maps can be obtained using active sensing technology, such as a structured-light depth sensor. Although the following example is illustrated, embodiments of the present application may utilize world mesh that may be generated from any suitable world mesh creation method. One of ordinary skill in the art would recognize many variations, modifications, and alternatives.

Figure 17:
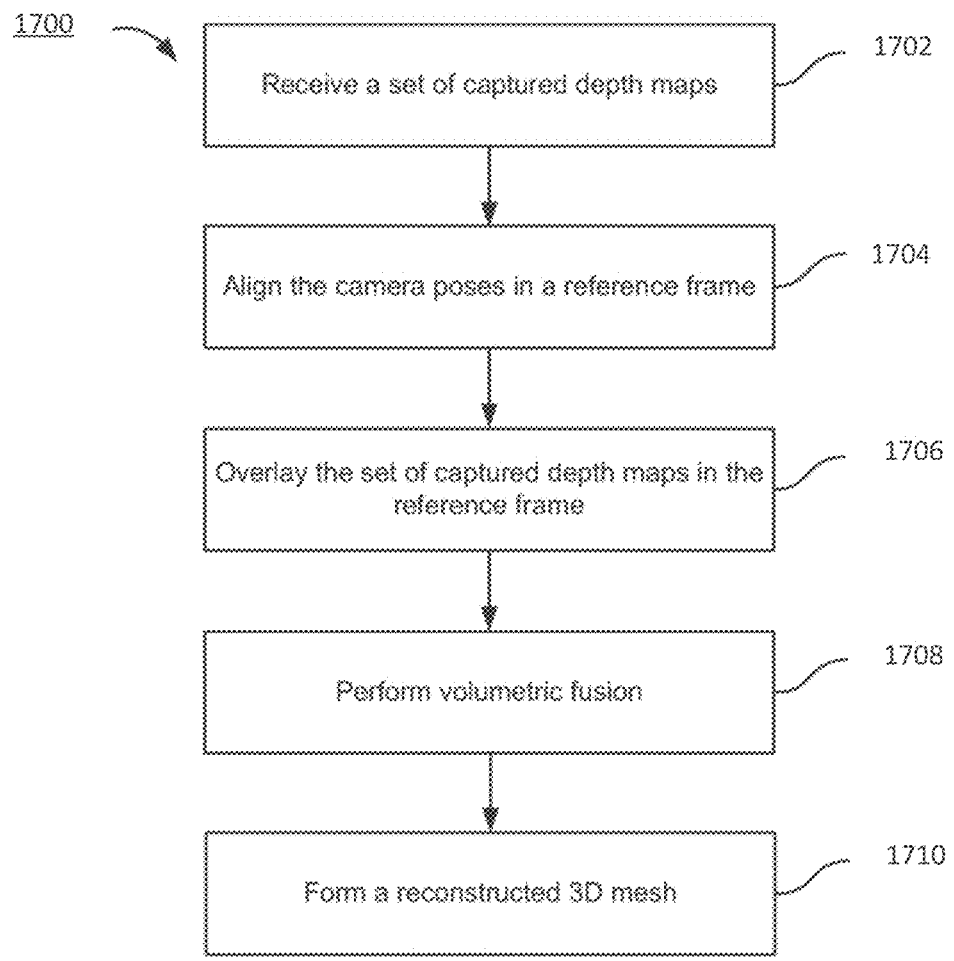
FIG. 17 illustrates a simplified flowchart illustrating a method for creating a 3D mesh of a scene using multiple frames of captured depth maps.
Figure 18:
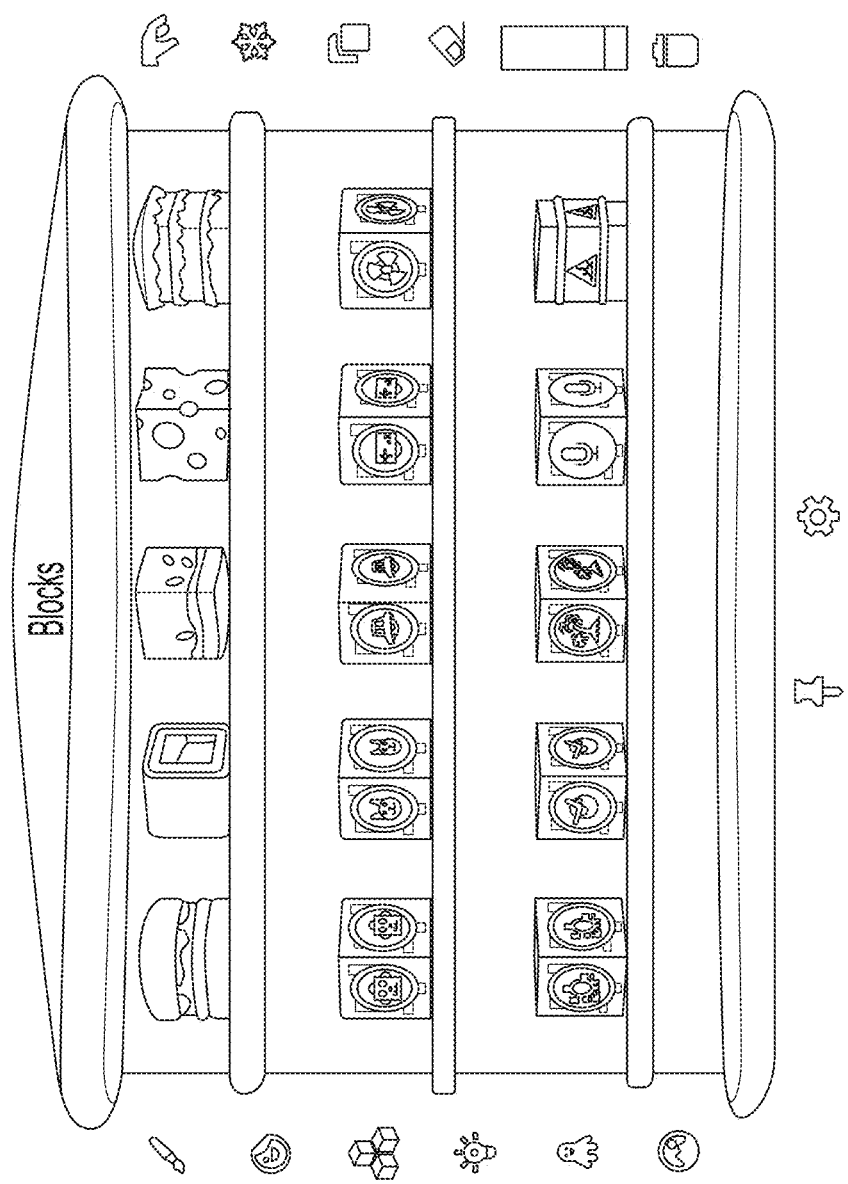
FIG. 18 is a sketch of an exemplary user interface presenting to a user of an augmented reality system a menu of pre-built virtual objects for incorporation into a scene.

FIG. 17 is a simplified flowchart illustrating a method for creating a 3D mesh of a scene using multiple frames of captured depth maps. Referring to FIG. 17, a method to create a 3D model of a scene, for example, a 3D triangle mesh representing the 3D surfaces associated with the scene, from multiple frames of captured depth maps is illustrated. The method 1700 includes receiving a set of captured depth maps (1702). A captured depth map is a depth image in which each pixel has an associated depth value representing the depth from the pixel to the camera obtaining the depth image. In comparison with a colored image that can have three or more channels per pixel (e.g., RGB image with red, green and blue components), a depth map can have a single channel per pixel (i.e., pixel distance from the camera). The process of receiving the set of captured depth maps can include processing input images, for example, RGB images, to produce one or more captured depth maps, also referred to as a frame of a captured depth map. In other embodiments, the captured depth maps are obtained using a time of flight camera, a LIDAR, stereo cameras, or the like, and are thus received by the system.

The set of captured depth maps includes depth maps from different camera angles and/or positions. As an example, a depth map stream can be provided by a moving depth camera. As the moving depth camera pans and/or moves, the depth maps are produced as a stream of depth images. As another example, a still depth camera could be used to collect multiple depth maps of portions or all of a scene from different angles and/or different positions, or combinations thereof.

The method also includes aligning the camera poses associated with set of captured depth maps in a reference frame (1704) and overlaying the set of captured depth maps in the reference frame (1706). In an embodiment, the process of pose estimation is utilized to align the depth points from all cameras and to create a locally and globally consistent point cloud in 3D world coordinates. The depth points from the same position in the world coordinate should be aligned as close to each other as possible. Due to inaccuracy present in the depth maps, however, pose estimation is usually not perfect, especially on structural features such as the corners of walls, the ends of walls, door frames in indoor scenes, and the like, which cause artifacts on these structural features when they are present in the generated mesh. Moreover, these inaccuracies can be exacerbated when mesh boundaries are seen as occluders (i.e., objects occluding background objects) because the artifacts will be much more noticeable to the user.

In order to align the camera poses, which indicates the position and orientation of the camera associated with each depth image, the depth maps are overlaid and differences in the positions of adjacent and/or overlapping pixels are reduced or minimized. Once the positions of the pixels in the reference frame have been adjusted, the camera pose is adjusted and/or updated to align the camera pose with the adjusted pixel positions. Thus, the camera poses are aligned in the reference frame (1706). In other words, a rendered depth map can be created by projecting the depth points of all depth maps to the reference frame (e.g., a 3D world coordinate system) based on the estimated camera poses.

The method further includes performing volumetric fusion (1708) to form a reconstructed 3D mesh (1710). The volumetric fusion process can include fusing multiple captured depth maps into a volumetric representation as a discretized version of sign-distance function of the observed scene. The 3D mesh generation can include the use of the marching cubes algorithm or other suitable method to extract a polygonal mesh from the volumetric representation in the 3D space.

Further details describing methods and systems for creating a 3D mesh of a real world environment (e.g. world mesh) are provided in U.S. Non-Provisional patent application Ser. No. 15/274,823, entitled "Methods and Systems for Detecting and Combining Structural Features in 3D Reconstruction," which is expressly incorporated herein by reference in its entirety.

User Manipulation Process

Figure 12:
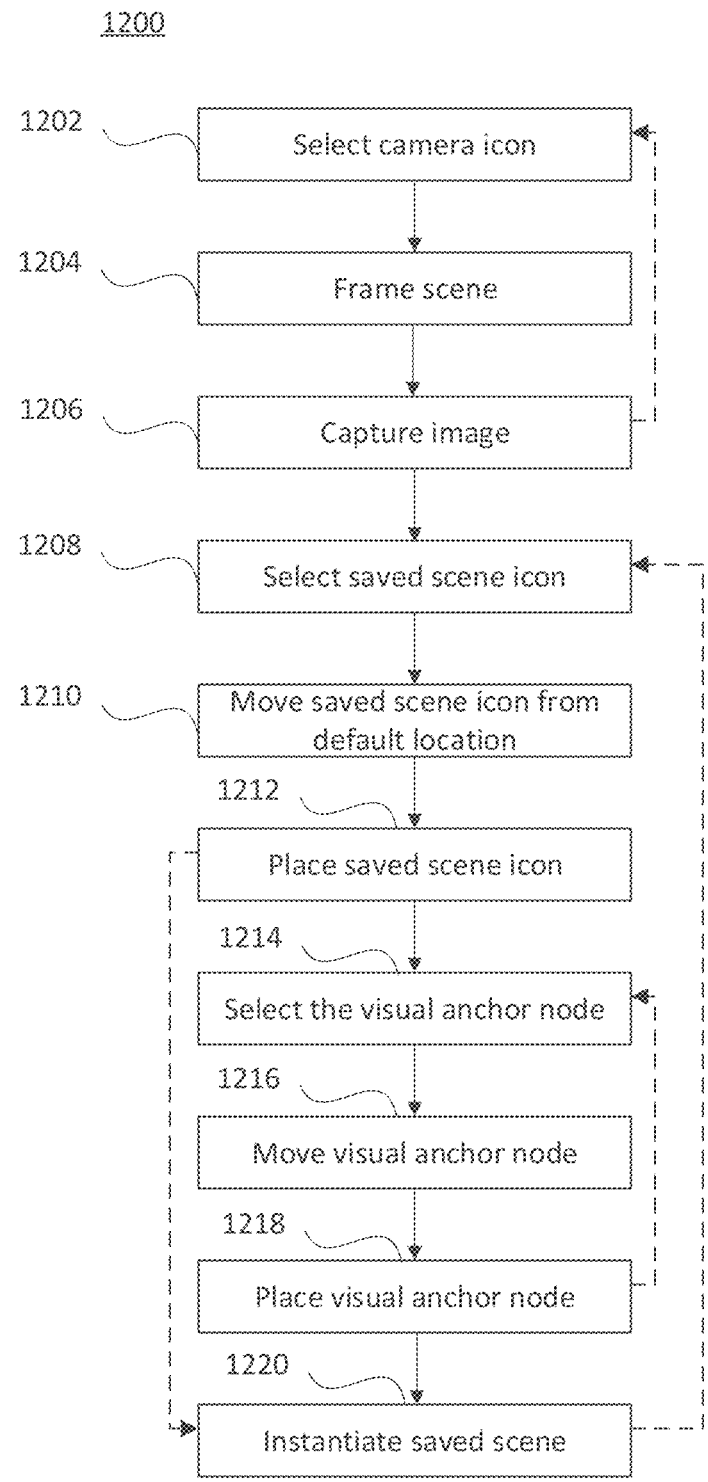
FIG. 12 illustrates an example process 1200 of a user interaction using the system and methods described herein.

FIG. 12 illustrates an example process 1200 of a user interaction using the system and methods described herein in which the user may create and save a scene and then later open that scene. For example, a user may be playing a game on a AR/VR/MR wearable system, such as wearable system 200 and/or 900 described above. The game may enable the user to build virtual structures utilizing virtual blocks. The user may spend all day building an elaborate structure, for example, a replica of the user's house, and wish to save the structure for later use. The user may wish to ultimately build the user's entire neighborhood or city. If the user saves the user's house, the user is able to re-open the house and continue working on the neighborhood, the next day for example. Since many neighborhoods reuse home designs, the user may be able to build and separately save only five basic designs, and load those designs one or more times into a single scene in order to build the neighborhood. The neighborhood scene may then be saved as an additional scene. If the user wishes to continue building, the user may load one or more of the neighborhood scenes, in some embodiments, in combination with one or more of the five basic home designs, to continue building an entire city.

The user may choose to save any combination of block designs (i.e. a single wall, a single house, an entire street of houses, a neighborhood, etc.) for subsequent re-use in future games/designs.

In this example, the user initiates a process of storing a scene by selecting an icon that serves as a control to initiate the capture process. At step 1202, the user may select a camera icon. In some embodiments the icon may not be a camera, but could be a different visual representation (e.g. text, image, etc.) of a computer program or code on the system that may create a virtual camera on the system. For example, the visual representation could be a word, such as "Camera", "Start Camera", or "Take Picture", or the visual representation could be an image, such as the image of a camera, the image of a picture, the image of a flower, or the image of a person. Any suitable visual representation may be used.

When the user selects the camera icon, or visual representation of a virtual camera, a virtual camera may appear in the user's environment. The virtual camera may be interacted with by the user. For example, the user may look through the virtual camera to view real and virtual world content through the camera's FOV, the user may grab the virtual camera and move the camera around, and/or the user may manipulate the camera through a user menu (e.g. to cancel out of the virtual camera, to take a picture, etc.). In some embodiments, the user interactions are as described above, for example in FIGS. 9-11. In some embodiments, the virtual camera may provide the same FOV as the user's FOV through the wearable device. In some embodiments, the virtual camera may provide the same FOV as the user's right eye, the user's left eye, or both of the user's eyes.

At step 1204, the virtual camera may be operated until it frames a scene. In some embodiments, the camera may frame the scene using a technique based on user preference, which may specify the manner of selecting a scene. For example, the frame may initially be the default view through the virtual camera viewfinder (i.e. a device or part of a camera showing the field of view of the lens and/or camera system) when the virtual camera is first displayed to the user. The viewfinder may appear to the user as a preview image displayed on the virtual camera, analogous to how many real world digital cameras have a display on the back of the real world camera to preview the image before it is captured. In some embodiments, the user may manipulate the camera to change the frame of the scene. The changed frame may change the preview image displayed on the virtual camera. For example, the user may select the virtual camera by pushing a button on a multi-DOF controller as described above, such as a totem, and move the totem in order to move the virtual camera. Once the user has the desired view through the virtual camera, the user may release the button to stop movement of the virtual camera. The virtual camera may be moved in some or all possible translations (e.g., left/right, forward/backward, or up/down) or rotations (e.g., yaw, pitch, or roll). Alternative user interactions may be used, such as click and release of a button for virtual camera selection, and a second click and release of a button to release the virtual camera. Other interactions may be used in order to frame a scene through the virtual camera.

The virtual camera may display a preview image to the user during step 1204. The preview image may contain virtual content that is within the virtual camera FOV. Alternatively or additionally, in some embodiments, the preview image may comprise a visual representation of the world mesh data. For example, the user may see a mesh version of a real world couch within the virtual camera FOV in the same location as the real couch. The virtual content and mesh data may be spatially correct. For example, if a virtual avatar is seated on the real world couch, then the virtual avatar would appear seated on the mesh couch at the same location, orientation, and/or position. In some embodiments, only the virtual content is displayed in the preview image. In some embodiments, the virtual content is previewed in the same spatial arrangement as the virtual content is placed in the real world. In some embodiments, the virtual content is previewed in a different spatial arrangement, such as a cluster, row, circle, or other suitable arrangement.

In some embodiments, the system may automatically frame the scene through the virtual camera, for example, to include the greatest number of virtual objects possible through the viewfinder. Alternate methods of automatic scene framing may be used, such as framing the virtual scene so the user's FOV matches the virtual camera FOV. In some embodiments, the system may automatically frame the scene using a hierarchy of objects, so that higher priority objects are within the frame. For example, living creatures such as people, dogs, cats, birds, etc. may be higher priority than inanimate objects, such as a table, chair, cup, etc. Other suitable methods may be used to automatically frame the scene or to create a priority system for automatic framing.

Regardless of how the scene is framed, the system may capture saved scene data. The saved scene data may be used by an augmented reality system to render the virtual content of the scene when the saved scene is later opened. In some embodiments, the saved scene may comprise saved scene objects at spatially fixed locations relative to each other.

In some embodiments, the saved scene data may comprise data that fully represents the saved scene, so the scene may be re-rendered at a later time and/or at a different location than when and where the scene was saved. In some embodiments, the saved scene data may comprise data required by a system in order to render and display the saved scene to the user. In some embodiments, the saved scene data comprises a saved PCF, an image of the saved scene, and/or saved scene objects.

In some embodiments, the saved PCF may be the closest PCF to the user, when the saved scene was saved. In some embodiments, the saved PCF may be a PCF within the framed scene (step 1204). In some embodiments, the saved PCF may be a PCF within the user's FOV and/or FOR when the scene was saved. In some embodiments, there may be more than one PCF available to save. In this case, the system may automatically choose the most reliable PCF (e.g. the PCF least likely to change over time, per the PCF description above). In some embodiments, the saved scene data may have more than one PCF associated with the saved scene. The saved scene data may designate a primary PCF, and one or more back-up or secondary PCFs.

In some embodiments, the virtual objects to be saved as part of the scene may be determined based on the objects within the framed scene when a scene is saved. Saved scene objects, for example, may be virtual objects (e.g. digital content) that appear to be located in the user's real world environment at the time the scene was saved. In some embodiments, saved scene objects may exclude one or more (up to all) user menus within the saved scene. In some embodiments, the saved scene objects comprise all virtual objects within the virtual camera's FOV. In some embodiments, the saved scene objects comprise all virtual content that the user could perceive in the real world within the user's FOR. In some embodiments, the saved scene objects comprise all virtual content that the user may perceive in the real world within the user's FOV. In some embodiments, the saved scene objects comprise all virtual objects that are in the user's environment, regardless of whether the virtual content is within the virtual camera's FOV, user's FOV, and/or user's FOR. In some embodiments, the saved scene objects may comprise any sub-set of virtual objects within the user's environment. The sub-set may be based on a criteria, such as type of virtual object, for example one sub-set may be for building blocks, and a different sub-set may be for landscaping (i.e. plants) around the buildings. An exemplary process for saving a scene is described below in connection with FIG. 13A.

In addition to storing virtual content and location information, the system in step 1206, may capture an image of the framed scene. In some embodiments, the image is captured when the user provides a user interaction, such as pushing a button on a controller, through a gesture, through user head pose, through user eye gaze, and/or any other suitable user interaction. In some embodiments, the system may automatically capture the image. The system may automatically capture the image when the system has finished automatically framing the scene, as in some embodiments of step 1204. In some embodiments, the system may automatically capture the image after the user frames the scene in step 1204, for example, by using a timer (e.g. if 5 seconds have passed since the user last moved the camera, the system will automatically capture the image). Other suitable methods of automatic image capture may be used. In some embodiments, storage of the scene may be initiated in response to the same events that trigger capture of an image, but the two actions may be controlled independently, in some embodiments.

In some embodiments, the captured image may be saved to permanent memory, such as a hard drive. In some embodiments, the permanent memory may be the local processing and data module 260, as described above. In some embodiments, the system may save the scene when the image is captured. In some embodiments, the captured image may comprise virtual objects, world mesh, real world objects, and/or any other content with renderable data. In some embodiments, the user may wish to save more than one scene, and hence the process may loop back to step 1202. Further details describing methods and systems related to capturing an image comprising virtual objects and real world objects are provided in U.S. Non-Provisional patent application Ser. No. 15/924,144, (now Pub. No.: US 2018/0268611) entitled "Technique for recording augmented reality data," which is expressly incorporated herein by reference in its entirety.

At step 1208, a saved scene icon may be selected. The saved scene icon may be the framed scene captured in step 1206. In some embodiments, the saved scene icon may be any suitable visual representation of the saved scene. In some embodiments, the saved scene icon may comprise the image captured in step 1206. For example, the saved scene icon may appear as a 3D box with one side of the box comprising the captured image. In some embodiments, the saved scene icon may be one of one or more saved scene icons. The saved scene icon may be presented in a user menu designed for saved scene selection.

Once scenes are saved, they may be opened by a user such that the virtual content of the saved scene appears in the augmented reality environment of the user for which the scene was opened. In an exemplary user interface to an augmented reality system, a scene may be opened by selecting a saved scene icon in a way that indicates selection of an icon to trigger opening of a scene. The indication may be via user initiation of a command, such as a LOAD icon, or may be inferred from context, for example. In some embodiments, the user may select a saved scene icon. The user may select the saved scene icon using any suitable user interaction, such as a click of a button, a gesture, and/or a voice command. In some embodiments, the system may automatically select a saved scene icon. For example, the system may automatically select a saved scene icon based on user location. The system may automatically select a saved scene icon that corresponds to a saved scene that was previously saved in the room where the user is currently located. In some embodiments, the system may automatically select a saved scene icon based on context. For example, if the user saved a scene at school, the system may automatically select the saved scene if the user is at any educational setting.

FIG. 12 includes steps for selecting and opening a saved scene. At step 1210, the saved scene icon is moved from its default location. In some embodiments, the saved scene icon is located within a saved scene user menu which may contain one or more saved scene icons that represent one or more saved scenes. In some embodiments, the saved scene icon is not located in a saved scene user menu, and is instead an isolated icon. For example, the saved scene icon may be automatically placed within the saved scene. As a specific example, the saved scene icon may be automatically placed at the saved PCF location or at the location the user was when the scene was saved.

At step 1212, the saved scene icon may be placed in the user's environment. In some embodiments, the user may select a saved scene icon from a saved scene user menu 1208 by pressing a button on a multi-DOF controller, for example. By moving the controller, the user can then pull the saved scene icon out of the user menu 1210 and then place the saved scene icon 1212 by releasing the button on the multi-DOF controller. In some embodiments, the user may select a saved scene icon from its default saved PCF location 1208 by pressing a button on a multi-DOF controller, for example. The user may then move the saved scene icon out of the default saved PCF location 1210 and then place the saved scene icon 1212, for example closer to the user's current location, by releasing the button on the multi-DOF controller. In some embodiments, the system may automatically place the saved scene icon 1212. For example, the system may automatically move the saved scene icon to a fixed distance from the user, or may automatically place the saved scene icon relative to a multi-DOF controller, such as at the tip of a totem. In some embodiments, the system may automatically place the saved scene icon at a fixed location relative to a user's hand if a particular gesture is performed, such as a pinch or point gesture, for example. Any other suitable method may be used to place the saved scene icon 1212, whether the placement is automatically performed by the system or by the user.

After step 1212, the saved scene icon may be instantiated 1220 into a copy of the original scene, or the saved scene icon may be further manipulated by steps 1214-1218.

At step 1214, the user may select a position of a visual anchor node indicating where the saved scene is to be opened. Once the visual anchor node is selected, when the saved scene is opened, the system may render virtual content of the saved scene with the saved scene anchor node aligned with the visual anchor node, such that the virtual content appears with the same spatial relationship with respect to the visual anchor node as it has to the saved scene anchor node. In some embodiments, the saved scene icon may indicate the location of the visual anchor node. In some embodiments, the saved scene icon may change its visual representation after being placed 1212 to comprise a visual anchor node which was previously not visible to the user. In some embodiments, the saved scene icon may be replaced with a different visual representation of a visual anchor node. In some embodiments, the saved scene icon and the visual anchor node are the same. In some embodiments, the visual anchor node may be a separate icon from the saved scene icon, providing a visual representation of the saved scene anchor node.

The saved scene anchor node may be the root node that all saved scene objects are placed relative to in order to maintain consistent spatial relativity between saved scene objects within a saved scene. In some embodiments, the saved scene anchor node is the highest node in the saved scene hierarchy of nodes that represent at least a portion of the saved scene data. In some embodiments, the saved scene anchor node is the anchor node in a hierarchical structure that represents at least a portion of the saved scene data. In some embodiments, the saved scene anchor node may act as a reference point for placing the saved scene objects relative to each other. In some embodiments, the saved scene anchor node may represent a scenegraph for the saved scene objects.

Regardless of how the visual anchor node appears to the user, the user may through the user interface, instruct the system to set the location of the visual anchor node. At step 1216, the user may move the visual anchor node. In some embodiments, when the visual anchor node is moved, the virtual scene objects move with the visual anchor node. In some embodiments, the visual anchor node is a visual representation of the saved scene anchor node. In some embodiments, the visual anchor node may provide a point and coordinate system with which to manipulate the saved scene anchor node location and orientation. In some embodiments, moving the visual anchor node 1216 may mean translation, rotation, and/or 6DOF movement.

In step 1218, the user may place the visual anchor node. In some embodiments, the user may select the visual anchor node 1214 by pushing a button on a totem, for example. The user may then move the visual anchor node 1216 within the user's real world environment and then place the visual anchor node 1218 by releasing the button on the totem, for example. Moving the visual anchor node moves the entire saved scene relative to the user's real world. Steps 1214-1218 may function to move all of the saved scene objects within the user's real world. Once the saved scene is at the desired location, the saved scene may be instantiated 1220. At step 1220, instantiating the saved scene may mean a full copy of the saved scene is presented to the user. However, it should be appreciated that the virtual content of the saved scene may be presented with the same physics and other characteristics as other virtual content rendered by the augmented reality system. Virtual content that is occluded by physical objects in the location where the saved scene is opened may not be visible to the user. Likewise, when the position of the virtual content, as determined by its position with respect to the visual scene anchor node, may be outside the users FOV and likewise may not be visible at the time of opening the scene. The augmented reality system may nonetheless have information about this virtual content available for rendering it, which may occur when the user's pose or environment changes such that this virtual content becomes visible to the user.

After step 1220, the process may repeat starting at step 1208. This loop may enable the user to load more than one saved scene at a time into the user's environment.

In one exemplary embodiment, process 1200 starts with a user that has already assembled one or more component virtual object pieces into a scene, such as the user building a replica of the user's house out of component (e.g. pre-designed, pre-loaded, provided as manipulatable objects from the application) virtual building blocks. The user then selects the camera icon 1202, frames a scene 1204 to help the user remember what the scene comprises, and then the user presses a button to capture the image 1206 of the replica of the user's house. At this point the replica of the user's house is saved to the system and a saved scene icon corresponding to the replica of the user's house may be displayed to the user in a saved scene user menu. The user may turn off the system, go to bed for the night, and then resume building the next day. The user may select the saved scene icon 1208 that corresponds to the replica of the user's house from the saved scene user menu by clicking a button on a totem, pulling the saved scene out of the saved scene user menu 1210, and then placing the saved scene icon 1212 in front of the user by dragging the saved scene icon to the desired location and releasing the button on the totem. A preview of the saved scene objects may automatically appear to the user, with a visual anchor node centrally located relative to the saved scene objects. The preview may appear as a white-washed, spatially correct, visual-only copy of the saved scene. The user may decide to change where the saved scene is located based on the preview, and may thus select the visual anchor node 1214 by clicking a button on the totem, move the visual anchor node 1216 (which may cause all of the saved scene objects to move with the visual anchor node to maintain relative positioning to the visual anchor node and internally between the saved scene objects) by moving the totem, and then placing the visual anchor node 1218 at a different location in the user's environment by releasing the button on the totem. The user may then select a "load scene" virtual button from a user menu, which may cause the saved scene to instantiate 1220 and thus fully load the virtual scene by rendering the full saved scene data (e.g. an exact copy of the original scene, except potentially in a different location than where it was saved).

Process for Saving a Scene

Figure 13A:
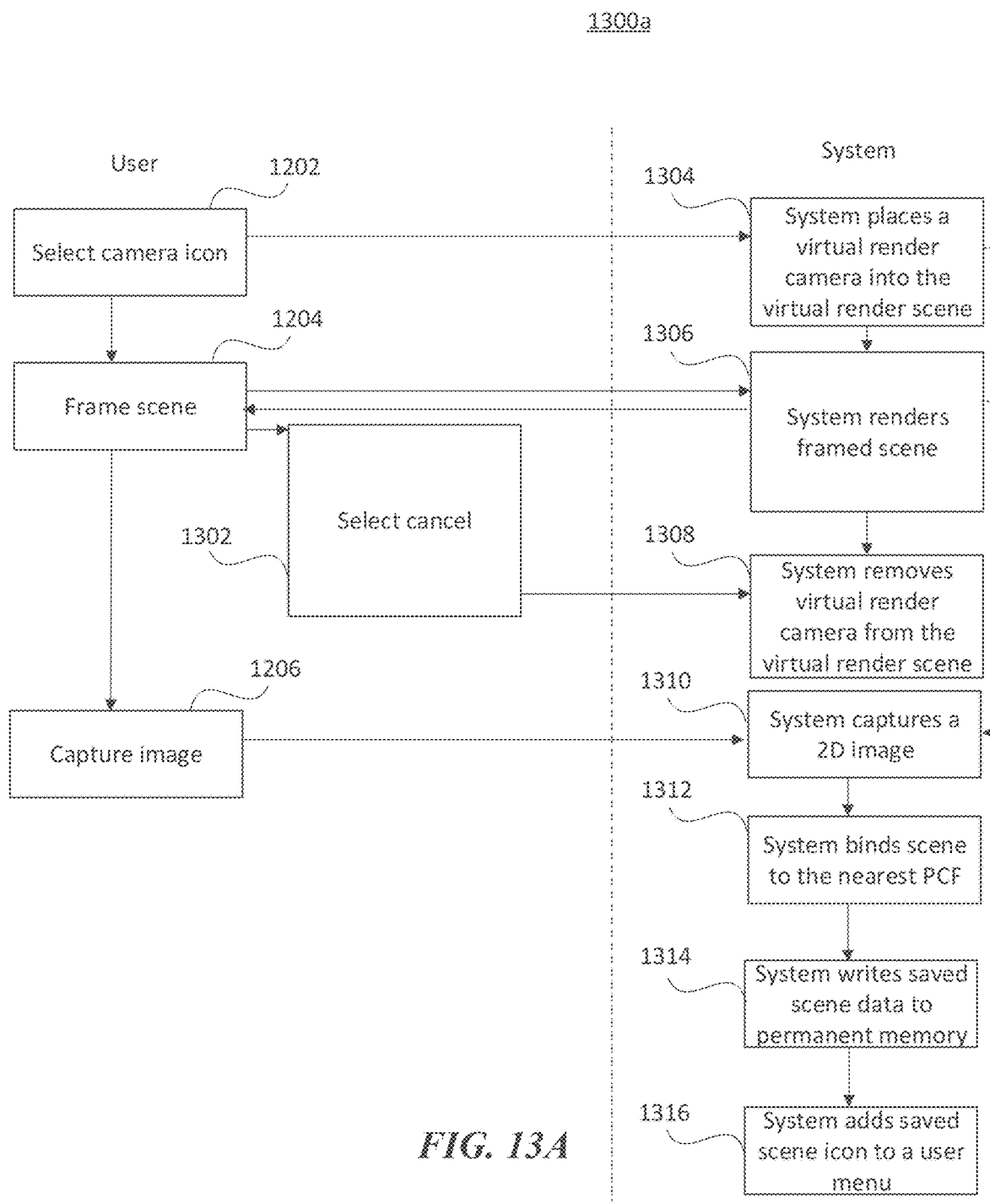
FIG. 13A illustrates an example process 1300a for saving a scene using the system and methods described herein.

FIG. 13A illustrates an example process 1300a for saving a scene using the system and methods described herein. The process 1300a may start with an application already open and running on a AR/VR/MR wearable system, such as wearable system 200 and/or 900 described above, that may enable a user to place one or more pre-designed virtual objects into the user's real world environment. The user's environment may already be meshed (e.g. the world mesh available to the application is already created). In some embodiments, the world mesh may be an input to a map database, such as the map database 710 from FIG. 7 and/or FIG. 8 for example. The world mesh may be combined with world mesh from other users, or from the same user from different sessions and/or over time, to form a larger world mesh stored in the map database. The larger world mesh may be called the passable world, and may comprise mesh data from the real world in addition to object tags, location tags, and the like. In some embodiments, the meshed real world environment available to the application may be any size, and may be determined by the processing capabilities of the wearable system (may not exceed a maximum allocated compute resource allocated to the application). In some embodiments, the meshed real world environment (world mesh) available to the application may have a 15 foot by 15 foot footprint with a ten foot height. In some embodiments, the world mesh available to the application may be the size of the room or building the user is located in. In some embodiments, the world mesh size and shape available to the application may be the first 300 square feet meshed by the wearable system when the application is first opened. In some embodiments, the mesh available to the application is the first area or volume meshed until a maximum threshold has been met. Any other surface area or volumetric measure may be used, in any quantity, as long as the wearable system has the compute resources available. The shape of the world mesh available to the application may be any shape. In some embodiments, a surface area may be defined for the world mesh available to the application and could be the shape of a square, rectangle, circle, polygon, etc., and may be one continuous area or may be two or more disconnected areas (as long as the total does not exceed the maximum surface area threshold, for example). In some embodiments, a volume may be defined for the world mesh available to the application, and may be a cube, sphere, torus, cylinder, cuboid, cone, pyramid, prism, etc., and may be continuous volume or may be two or more disconnected volumes (as long as the total does not exceed the maximum volume threshold, for example).

Example process 1300a may begin at step 1202 when a camera icon is selected, as described for FIG. 12. Step 1202 may cause the system to place a virtual render camera into a virtual render scene 1304. The virtual render scene may be a digital representation, created by manipulation of data on one or more processors (such as processing modules 260 or 270 or remote data repository 280 or wearable system 200, for example), of all renderable virtual content available to the user. One or more virtual render cameras may be placed in the virtual render scene. The virtual render cameras may function similar to real world cameras in that the virtual render camera has a location and orientation in (virtual render world) space and may capture a 2D image of a 3D scene from that location and orientation.

The virtual render camera may act as an input for a render pipeline for the wearable system, with the location and orientation of the virtual render camera defining portion of the user's environment, including virtual content present in that portion of the environment that will be rendered to the user as an indication of what the render camera is being pointed at. The render pipeline may comprise one or more processes required in order for the wearable system to convert digital data into virtual content ready for display to the user. In some embodiments, rendering for the wearable system may occur in a render engine, which may be located in a graphics processing unit (GPU), which may be part of or connected to the processing modules 160 and/or 270. In some embodiments, the render engine may be a software module in a GPU that may provide images to display 220.

In some embodiments, the virtual render camera may be placed in the virtual render scene at a position and orientation such that the virtual render camera has the same perspective and/or FOV as the default view through the virtual camera viewfinder, as described in context of FIG. 12.

In some embodiments, a "virtual render camera," which is sometimes also referred to as a "render camera", "pinhole perspective camera" (or simply "perspective camera") or "virtual pinhole camera", is a simulated camera for use in rendering virtual image content possibly from a database of objects in a virtual world. The objects may have locations and orientations relative to the user or wearer and possibly relative to real objects in the environment surrounding the user or wearer. In other words, the render camera may represent a perspective within render space from which the user or wearer is to view 3D virtual contents of the virtual render world space (e.g., virtual objects). The user may view the render camera perspective by viewing a 2D image captured from the virtual render camera's perspective. The render camera may be managed by a render engine to render virtual images based on the database of virtual objects to be presented to said eye. The virtual images may be rendered as if taken from the perspective of the user or wearer, from the perspective of the virtual camera that may frame the scene in step 1204, or from any other desired perspective. For example, the virtual images may be rendered as if captured by a pinhole camera (corresponding to the "render camera") having a specific set of intrinsic parameters (e.g., focal length, camera pixel size, principal point coordinates, skew/distortion parameters, etc.), and a specific set of extrinsic parameters (e.g., translational components and rotational components relative to the virtual world). The virtual images are taken from the perspective of such a camera having a position and orientation of the render camera (e.g., extrinsic parameters of the render camera).

The system may define and/or adjust intrinsic and extrinsic render camera parameters. For example, the system may define a particular set of extrinsic render camera parameters such that virtual images may be rendered as if captured from the perspective of a camera having a specific location with respect to the user's or wearer's eye so as to provide images that appear to be from the perspective of the user or wearer. The system may later dynamically adjust extrinsic render camera parameters on-the-fly so as to maintain registration with said specific location, as used for eye tracking for example. Similarly, intrinsic render camera parameters may be defined and dynamically adjusted over time. In some implementations, the images are rendered as if captured from the perspective of a camera having an aperture (e.g., pinhole) at a specific location with respect to the user's or wearer's eye (such as the center of perspective or center of rotation, or elsewhere).

Further details describing methods and systems related to render pipelines and render cameras are provided in U.S. Non-Provisional patent application Ser. No. 15/274,823, entitled "Methods and Systems for Detecting and Combining Structural Features in 3D Reconstruction," and U.S. Non-Provisional patent application Ser. No. 15/683,677, entitled "Virtual, augmented, and mixed reality systems and methods," which is expressly incorporated herein by reference in its entirety.

At step 1306, the system may render the framed scene 1306, as framed in step 1204. In some embodiments, the system may render the framed scene at a regular refresh rate defined by the system, when the location and/or orientation of the virtual camera changes during scene framing 1204, or at any other suitable time. In some embodiments, as the virtual camera moves during step 1204, the virtual render camera moves with corresponding movement within the virtual render scene to maintain a perspective corresponding to the virtual camera perspective. In some embodiments, the virtual render camera may request all renderable data available to the virtual render camera be sent to the render pipeline. Renderable data may be the collection of data required by the wearable system in order to display virtual content to the user. Renderable data may be the collection of data required by the wearable system in order to render virtual content. The renderable data may represent the virtual content in the field of view of the virtual render camera. Alternatively or additionally, the renderable data may include data representing objects in the physical world, extracted from images of the physical world acquired with sensors of a wearable system and converted into a format that can be rendered.

For example, raw world mesh data, which may be generated from images collected with cameras of a wearable augmented reality system, may not be renderable. Raw world mesh data may be a collection of vertices, and thus not data that can be displayed to the user as a 3D object or surface. Raw world mesh data in raw text format may comprise a vertex comprising three points (x, y, and z) relative to the location of the virtual camera (and virtual render camera since their perspectives are synchronized). Raw world mesh data in raw text format, for example, may also comprise data representing the other nodes, or vertices, each vertex is connected to. Each vertex may be connected to one or more other vertices. In some embodiments, world mesh data may be thought of as a location in space and data specifying the other nodes the vertex is connected to. The vertex and connecting vertex data in the raw world mesh data may be subsequently used to build out polygons, surfaces, and hence a mesh, but would require additional data to make the raw world mesh data renderable. For example, a shader, or any other program capable of performing the same function, may be used to visualize the raw world mesh data. The program may follow a set of rules to automatically, computationally visualize the raw world mesh data. The shader may be programmed to draw a dot at each vertex location, and then draw a line between each vertex and the set of vertices connected to the vertex. The shader may be programmed to visualize the data in one or more colors, patterns, etc. (e.g. blue, green, rainbow, checkered, etc.). In some embodiments, the shader is a program designed to illustrate the points and connections of the world mesh data. In some embodiments, the shader may connect lines and dots to create surfaces on which a texture, or other visual manifestation may be added. In some embodiments, renderable world mesh data may comprise UV data such as UV coordinates. In some embodiments, the renderable world mesh data may comprise a depth check to determine overlap or obstructions between vertices within the raw world mesh data, or the depth check may alternatively be performed within the render pipeline as a separate process. In some embodiments, applying a shader and/or other processes to visualize raw world mesh data enables the user to visualize, and subsequently view, what is typically non-visual data. In some embodiments, other raw data or traditionally non-visual data may be converted to renderable data using the process described for the raw world mesh data. For example, anything that has a location in space may be visualized, for example by applying a shader. In some embodiments, PCFs may be visualized, such as by providing data defining an icon that can is positioned and oriented like the PCF.

Another example of renderable data (e.g. renderable 3D data, 3D renderable digital object), is data for a 3D virtual object, such as a character in a video game, a virtual avatar, or the building blocks used to build a replica of the user's house, as described for FIG. 12. Renderable data for a 3D virtual object may comprise mesh data and mesh renderer data. In some embodiments, mesh data may comprise one or more of vertex data, normal data, UV data, and/or triangle indices data. In some embodiments, mesh renderer data may comprise one or more texture data sets, and one or more properties (such as material properties, such as shininess, specular level, roughness, diffuse color, ambient color, specular color, etc., for example).

In some embodiments, the virtual render cameras may have settings that determine a sub-set of the renderable data to be rendered. For example, the virtual render camera may be capable of rendering three sets of renderable data: virtual objects, world meshes, and PCFs. The virtual camera may be set to render only virtual objects, only world mesh, only PCFs, or any combination of those three sets of renderable data. In some embodiments, there may be any number of sub-sets of renderable data. In some embodiments, setting a virtual render camera to render world mesh data with virtual object data may enable the user to see traditional visual data (3D virtual object, for example) superimposed on traditionally non-visual data (raw world mesh data, for example).

Figure 13B:
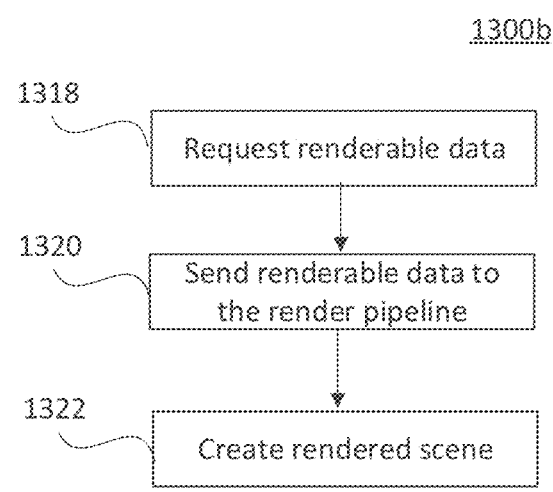
FIG. 13B illustrates an example process 1300b for rendering a framed scene using the system and methods described herein.

FIG. 13B illustrates an example process 1300b for rendering a framed scene using the system and methods described herein. Process 1300b may describe step 1306 in more detail. Process 1300b for rendering a framed scene may begin at step 1318 request renderable data. In some embodiments, the virtual render camera, that may correspond to the virtual camera of FIG. 12, requests renderable data for all renderable objects located within the virtual render camera's FOV within the virtual render scene. In some embodiments, the virtual render camera may only request the renderable data for objects the virtual render camera has been programmed to request. For example, the virtual render camera may only be programmed to request renderable data for 3D virtual objects. In some embodiments, the virtual render camera may request renderable data for 3D virtual objects and renderable data for world mesh data.

At step 1320, the renderable data is sent to the render pipeline 1320. In some embodiments, the render pipeline may be the render pipeline for the wearable system, such as wearable system 200. In other embodiments, the render pipeline may be located on a different device, on a different computer, or performed remotely. At step 1322, the rendered scene is created. In some embodiments, the rendered scene may be the output of the render pipeline. In some embodiments, the rendered scene may be a 2D image of a 3D scene. In some embodiments, the rendered scene may be displayed to the user. In some embodiments, the rendered scene may comprise scene data ready to be displayed, but not actually displayed.

In some embodiments, the system renders the framed scene and displays the rendered scene to the user through the virtual camera viewfinder. This may enable the user to view the framed scene, even as the virtual camera is moving, to preview the 2D image that would be captured if the capture image step 1206 was performed at that point in time. In some embodiments, the rendered scene may comprise visual and non-visual renderable data.

After step 1204, the user may choose to capture the image 1206 or select cancel 1302 to cancel the scene saving process 1300a. In some embodiments, step 1302 may be performed by the user. In some embodiments, step 1302 may be performed automatically by the system. For example, if the system is unable to automatically frame the scene in step 1204 to the specifications programmed (for example to capture all of the virtual objects within the frame), then the system may automatically cancel at step 1302 the scene saving process 1300a. If cancel is selected in step 1302, the system removes the virtual render camera corresponding to the virtual camera, from process 1200 for example, from the virtual render scene 1308.

If the image is captured at step 1206, the system captures a 2D image 1310. In some embodiments, the system captures a 2D image by taking a picture (storing data representing the 2D image being rendered) utilizing the virtual render camera within the virtual render scene. In some embodiments, the virtual render camera may function analogously to a real world camera. The virtual render camera may convert 3D scene data to a 2D image by capturing the projection of the 3D scene onto a 2D image plane from the virtual render camera's perspective. In some embodiments, the 3D scene data is captured as pixel information. In some embodiments, the virtual render camera is not analogous to a real world camera because the virtual render camera may be programmed to capture anywhere between one and all sub-sets of renderable data, whereas a real world camera captures everything that is present in the view. The 2D image captured in step 1310 may comprise only the sub-set(s) of renderable data that the camera is programmed to capture. The sub-sets of renderable data may comprise traditional visual data, such as 3D objects, and/or traditional non-visual data, such as world mesh or PCFs.

At step 1312 and 1314, the system saves the scene. Saving the scene may entail saving any or all of the types of saved scene data as described above, such as data representing the virtual content being rendered by the virtual render camera and, in some embodiments, position information. At step 1312, the system binds the scene to the nearest PCF. The application may send a request for the PCF ID to a lower level system operation that manages the list of PCFs and their corresponding locations. The lower level system operation may manage the map database, which may comprise the PCF data. In some embodiments, the PCFs are managed by a separate PCF application. The PCF bound to the scene may be called the saved PCF.

At step 1314, the system writes saved scene data to permanent memory of the wearable system. In some embodiments, the permanent memory may be a hard drive. In some embodiments, the permanent memory may be the local processing and data module 260, as described above. In some embodiments, the saved scene data may comprise data that fully represents the saved scene. In some embodiments, the saved scene data may comprise data required by a system in order to render and display the saved scene to the user. In some embodiments, the saved scene data comprises a saved PCF, an image of the saved scene, and/or saved scene objects. The saved scene objects may be represented by saved scene object data. In some embodiments, the saved scene object data may comprise a tag for what kind of object it is. In embodiments in which the saved scene object is derived by modifying a pre-designed base object, the saved scene object data may also indicate differences between the saved scene object and the pre-designed base object. In some embodiments, the saved scene object data may comprise a pre-designed base object name plus additional properties and/or state data. In some embodiments, the saved scene object data may comprise the renderable mesh plus state, physics, and other properties that may be required in order for the saved scene object to re-load as a copy of how it was saved.

At step 1316, the system may add a saved scene icon to a user menu. The saved scene icon may be a visual representation for the saved scene, and may optionally comprise the 2D image captured in step 1310. The saved scene icon may be placed in a user menu, for example a saved scene user menu. The saved scene user menu may contain one or more saved scenes for an application.

Process for Loading a Saved Scene

Figure 14:
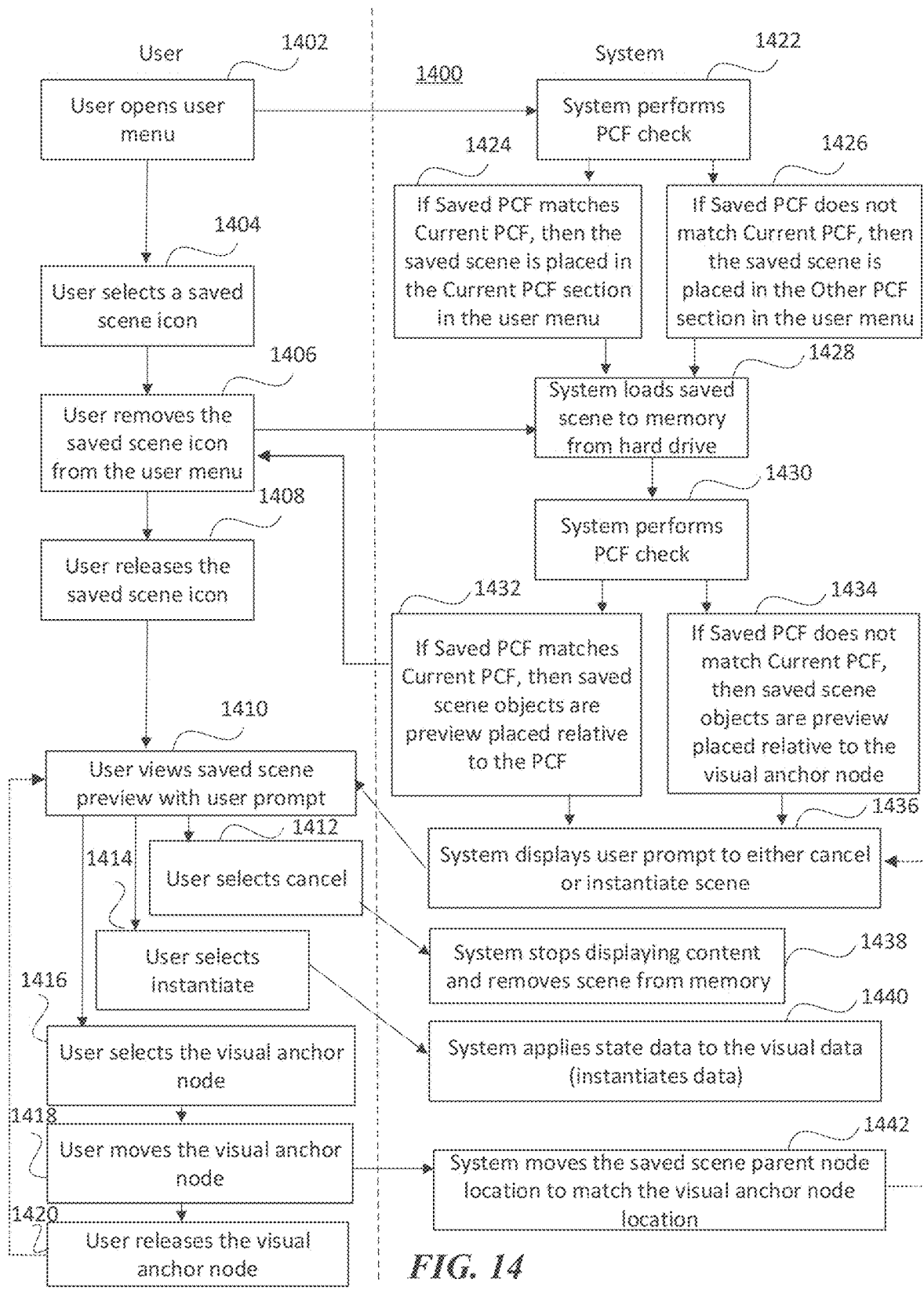
FIG. 14 illustrates an example process 1400 for loading a scene using the system and methods described herein.

FIG. 14 illustrates an example process 1400 for loading a scene using the system and methods described herein. The process 1400 may start at step 1402, where the user opens a user menu. The user menu may comprise one or more saved scene icons, which may represent one or more saved scenes. In some embodiments, the user menu may be a saved scene user menu. In response to step 1402, the system may perform a PCF check 1422. The PCF check may comprise one or more processes that determines the PCF closest to the user's current position (current PCF). In some embodiments, the application may determine the user's location. In some embodiments, the location may be based on the user's headpose location.

If the saved PCF matches the current PCF, then the saved scene may be placed in a current PCF section of the user menu 1424. If the saved PCF does not match the current PCF, then the saved scene may be placed in the other PCF section in the user menu. In some embodiments, steps 1424 and 1426 may be combined, for example if the user menu does not categorize the saved scenes based on the user's current location, or if the user's current PCF cannot be determined. At this point in process 1400, the user may view a saved scene user menu. In some embodiments, the user menu is separated into two sections—one section for saved scenes that have saved PCFs matching the current PCF, and a second section for saved scenes that have saved PCFs not matching the current PCF. In some embodiments, one of the two sections may be empty.

At step 1404, the user may select a saved scene icon from the user menu. The user menu may comprise a saved scene user menu. In some embodiments, the user may select the saved scene icon through a user interaction, such as a click of a button on a totem or other user controller.

At step 1406, the user may take an action indicating that the content of the virtual content of the selected saved scene is to be loaded into the environment of the user for which the saved scene is to be opened. For example, the user may remove the saved scene icon from the user menu 1406. In some embodiments, step 1406 may occur as the user holds down the button used to select the saved scene icon. Step 1428 may occur as a result of step 1406. When the saved scene icon is removed from the user menu 1406, the system may load the saved scene (or saved scene data) to volatile memory from a hard drive or other permanent memory 1428.

A location in the environment for the saved scene content may also be determined. In the illustrated embodiment, when the saved scene is opened in the same location at which it was saved, the system may display the visual content of the saved scene in the same location that it appeared at the time the scene was saved. Alternatively, if the saved scene is opened in a different location, an alternative approach, such as receiving user input as described below in connection with steps 416, 1418 and 1420, may be used.

To support opening the saved scene with objects in the same location as when the scene was stored, at step 1430, the system may perform a PCF check. The PCF check may comprise one or more processes that determines the PCF closest to the user's current position (current PCF). In some embodiments or process 1400, either PCF check 1422 or PCF check 1430 may be performed instead of both. In some embodiments, additional PCF checks may be added to process 1400. The PCF checks may occur at a fixed time interval (e.g. once per minute, once per second, once every five minutes, etc.), or may be based on a change in location of the user (e.g. if user movement is detected, the system may add an additional PCF check).

At step 1432, if the saved PCF matches the current PCF, then the saved scene objects are preview placed relative to the PCF. In some embodiments, preview placed may comprise rendering only the visual data associated with the saved scene data. In some embodiments, preview placed may comprise rendering the visual data associated with the saved scene data, in combination with one or more shaders to alter the appearance of the visual data and/or additional visual data. An example of additional visual data may be one or more lines that extend from the visual anchor node to each of the saved scene objects. In some embodiments, the user may be involved in performing step 1432, such as by providing input indicating locations of the saved scene objects. In some embodiments, the system may automatically perform step 1432. For example, the system may automatically perform step 1432 by calculating the location at the center of the saved scene objects and then placing the visual anchor node at the center.

At step 1434, if the saved PCF does not match the current PCF, then the saved scene objects are preview placed relative to a visual anchor node. In some embodiments, the relative placement may be placing the saved scene objects such that the visual anchor node in the center of the saved scene objects. Alternatively, the saved scene objects may be positioned to have the same spatial relationship with respect to the visual anchor node that those objects have with respect to a saved scene anchor node. In some embodiments, the placement may be determined by placing the visual anchor node at a fixed distance away from the user (e.g. 2 feet away from the user in the z-direction at eye level). In some embodiments, the user may be involved in performing step 1434, such as by providing input indicating the location of the visual anchor node. In some embodiments, the system may automatically perform step 1434. For example, the system may automatically perform step 1434 by automatically placing the visual anchor node at a fixed distance from the user menu or may select a location of the visual anchor node relative to a location of a physical or virtual object in the environment of the user for whom the saved scene is to be loaded.

At step 1436, the system may display a user prompt to the user to either cancel or instantiate the saved scene. The user prompt may have any suitable visual appearance, and may function to enable one or more user interactions in order to at least cause the system to either cancel re-opening the scene (e.g. process does not proceed to 1440) and/or instantiate the scene. In some embodiments, the user prompt may display one or more interactable virtual objects, such as a button labeled "cancel" or "load scene", for example.

In some embodiments, the system may display the saved scene preview as soon as the saved scene icon is removed from the user menu at step 1406 such that the user may be able to view the preview upon moving the icon. At step 1408, the user may release the saved scene icon to place the saved scene icon in the user's real world environment. At step 1410, the user may be able to view the saved scene preview and the user prompt to either cancel the saved scene load or to instantiate the scene. In some embodiments, a saved scene preview may comprise only the visual data associated with the saved scene, optionally with the visual data modified. In some embodiments, the visual data may appear white-washed. In some embodiments, the saved scene preview may appear as a ghost preview of the visual data corresponding to the saved scene data. In some embodiments, the saved scene preview may appear as a hollow copy of the data, where the preview looks recognizably similar to the saved seem, but may not have the same functionality or sound. In some embodiments, the saved scene preview may be the visual data corresponding to the saved scene data without state data or physics applied.

At step 1412, the user may select cancel. Step 1412 may cause the system to stop displaying content and remove the saved scene from volatile memory 1438. In some embodiments, the system may only stop displaying the saved scene content, but may keep the saved scene in volatile memory. In some embodiments, the content may comprise all or part of the saved scene data, user menus, user prompts, or any other virtual content that may be specific to the saved scene selected in step 1404.

At step 1414, the user may select to instantiate the saved scene. In some embodiments, this may be the same as step 1220. In some embodiments, step 1414 may fully load the virtual scene by rendering the full saved scene data (e.g. an exact copy of the original scene, except potentially in a different location than where it was saved). In some embodiments, the instantiation may comprise applying physics and state data to the visual preview.

At step 1416, the user may select the visual anchor node. At step 1418, the user may move the visual anchor node. This may cause the system to move the saved scene parent node location to match the visual anchor node location 1442. In some embodiments, the visual anchor node location may be moved without modifying anything else in the saved scene data. This may be achieved by placing the saved scene objects relative to the visual anchor node in a manner that preserves the spatial relationships between saved scene objects and the saved scene anchor node, regardless of where that visual anchor node may be located. In some embodiments, the process may loop back to step 1436 after step 1442.

At step 1420, the user may release the visual anchor node, indicating the location of the visual anchor node. The process may loop back to step 1410 after step 1420, where the user once again has the option to cancel the saved scene load 1412, instantiate the saved scene 1414, or move the visual anchor node 1416-1420 (and hence entire saved scene objects, which remain spatially consistent to each other).

In some embodiments, the system may perform one or more of the steps 1402-1420, described as involving user interaction with the system, partially or totally automatically. In one illustrative example of the system automatically performing steps 1402-1420, the system may automatically open a user menu 1402 when the current PCF matches a saved PCF. The system may have the PCF check process running the entire time the application is running, or the system may refresh the PCF check at fixed intervals (e.g. every 1 minute), or the system may run the PCF check if the system detects a change (e.g. user movement). At step 1402, the system may automatically select a saved scene if there is only one saved scene with a saved PCF that matches the current PCF. At step 1406, the system may automatically remove the saved scene icon from the user menu if the current PCF matches the saved PCF for more than a threshold period of time (e.g. five minutes). At step 1408, the system may automatically release the saved scene icon at a fixed distance from the user (e.g. 1 foot to the right of the user, in the x-direction). At step 1412, the system may automatically cancel out of process 1400 if the user leaves the room, thus causing the saved PCF to no longer match the current PCF. At step 1414, the system may automatically instantiate the saved scene if the current PCF matches the saved PCF for greater than a threshold period of time. The system may perform steps 1416-1420 automatically by moving the visual anchor node to maintain a fixed relative spatial relationship to the user while the user moves (e.g. visual anchor node is fixed to 2 feet in front of the user in the z-direction).

Process for Loading a Saved Scene-Shared Path

Figure 15:
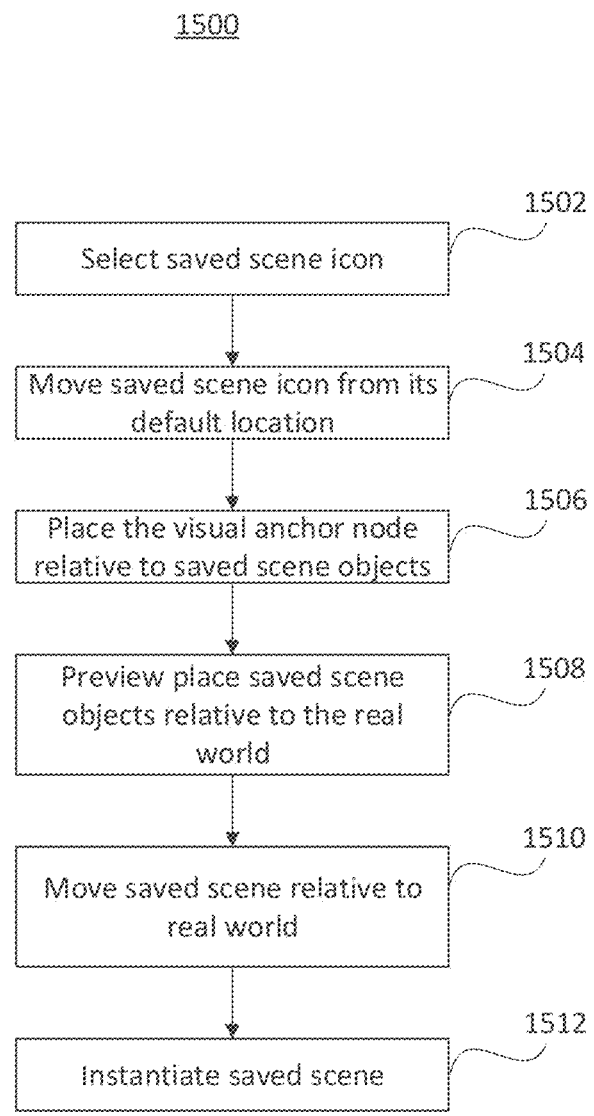
FIG. 15 illustrates an example process 1500 for loading a scene using the system and methods described herein.

FIG. 15 illustrates an example process 1500 for loading a scene using the system and methods described herein. At step 1502, a saved scene icon may be selected. In some embodiments, the user may select the saved scene icon. In some embodiments, the saved scene icon may be selected from a user menu, or may be selected as a stand alone icon placed in the user's real world environment. In some embodiments, the saved scene icon may be automatically selected by the wearable system and/or the application. For example, the system may automatically select the saved scene icon that is closest to the user, or the system may automatically select the saved scene icon that is most frequently used regardless of location.

At step 1504, the saved scene icon is moved from its default location. In some embodiments, the user may remove the saved scene icon from a user menu, as described in step 1406 in process 1400. In some embodiments, the system may automatically move the saved scene icon from its default position (e.g. in a user menu, or at a placed location in the user's environment). For example, the system may automatically move the saved scene icon to maintain a fixed distance from the user.

The system may determine a location for saved scene objects in the environment of the user for whom the saved scene is being opened. In some embodiments, the system may display a visual anchor node to the user and may enable the user to impact the location at which the saved scene objects are placed by inputting commands that move the location of the visual anchor node and/or the positioning of saved scene objects with respect to the visual anchor node. In some embodiments, the saved scene objects may each have a position with respect to a saved scene anchor node, and the saved scene objects may be positioned such that they have that same relative position to the visual anchor node, thus positioning the saved scene anchor node at the visual anchor node.

In other embodiments, user input may specify a spatial relationship between one or more saved scene objects and the visual anchor node. At step 1506, the visual anchor node may be placed relative to the saved scene objects. Placing the visual anchor node relative to the saved scene objects may function to tie a particular location to the saved scene anchor. The choice of visual anchor location may impact the relative level of ease or difficulty with which the saved scene may further be manipulated, for example to later place the saved scene objects relative to the environment. In some embodiments, the visual anchor node may be placed relative to the saved scene objects by releasing a button on a totem (if the user pressed a button to select and move the saved scene icon, for example). In some embodiments, the user may choose where to place the visual anchor node in relation to the saved scene objects. For example, the user may choose to place the visual anchor node in close proximity to a particular saved scene object. The user may choose to do this if the user only cares where that particular object is placed. In some embodiments, the user may wish to place the visual anchor node in a particular location that makes it easy to further manipulate the visual anchor node.

At step 1508, the saved scene objects may be preview placed relative to the real world. In some embodiments, the saved scene objects may be preview placed relative to the real world by moving the visual anchor node. Moving the visual anchor node may cause all of the saved scene objects to move with the visual anchor node, thus maintaining a fixed relative spatial configuration between the saved scene objects within a saved scene. In some embodiments, moving the visual anchor node may change the anchor node location to match the current visual anchor node location. In some embodiments, the user may manipulate the visual anchor node to place the saved scene in the desired location relative to the user's environment. In some embodiments, the system may automatically preview place the saved scene objects relative to the real world. For example, the objects of the saved scene may have been, at the time the saved scene was stored, positioned with respect to a surface. To position the saved scene objects upon opening the saved scene, the system may find the closest surface that has similar attributes and/or affordances to the surface on which the virtual objects were positioned when saved. Examples of affordances may include, surface orientation (e.g. vertical surface, horizontal surface), object type (e.g. table, couch, etc.), or relative height from the ground surface (e.g. low, medium, high height categories). Additional types of attributes or affordances may be used. In some embodiments, the system may automatically preview place an object in the real world on the next closest meshed surface.

An affordance may comprise a relationship between the object and the environment of the object which may afford an opportunity for an action or use associated with the object. The affordance may be determined based on, for example, the function, the orientation, the type, the location, the shape, or the size of the virtual object or the destination object. The affordances may also be based on the environment in which the virtual object or the destination object is located. The affordance of a virtual object may be programmed as part of the virtual object and stored in the remote data repository 280. For example, the virtual object may be programmed to include a vector which indicates the normal of the virtual object.

For example, an affordance of a virtual display screen (e.g., a virtual TV) is that the display screen can be viewed from a direction indicated by a normal to the screen. An affordance of a vertical wall is that objects can be placed on the wall (e.g., "hang" on the wall) with their surface normal parallel to a normal to the wall. An additional affordance of the virtual display and the wall can be that each has a top or a bottom. The affordances associated with an object may help ensure the object has more realistic interactions, such as automatically hanging the virtual TV right side up on a vertical surface.

Automatic placement of virtual objects by the wearable system, utilizing affordances, is described in U.S. Patent Publication No. 2018/0045963, published Feb. 15, 2018, which is incorporated by reference herein in its entirety.

At step 1510, the preview placed saved scene objects may be moved relative to the real world. In some embodiments, this may be accomplished by moving the visual anchor node. For example, the user may select the visual anchor node by performing a pinch gesture, may move the visual anchor node while maintaining the pinch gesture until the desired location has been reached, and then the user may stop the movement and release the pinch gesture. In some embodiments, the system may automatically move the saved scene relative to the real world.

At step 1512, the saved scene may be instantiated. Instantiating the scene may comprise applying the full saved scene data to the saved scene objects, as opposed to only applying the preview version of the saved scene. For example, the preview of the saved scene may involve only displaying the visual data, or a modified version of the visual data. Step 1512 may instead display the visual data as saved in the saved scene data, plus the rest of the data (e.g. physics), with the exception of the saved scene potentially having a new anchor node location.

Process for Loading a Saved Scene-Split Path

Figure 16:
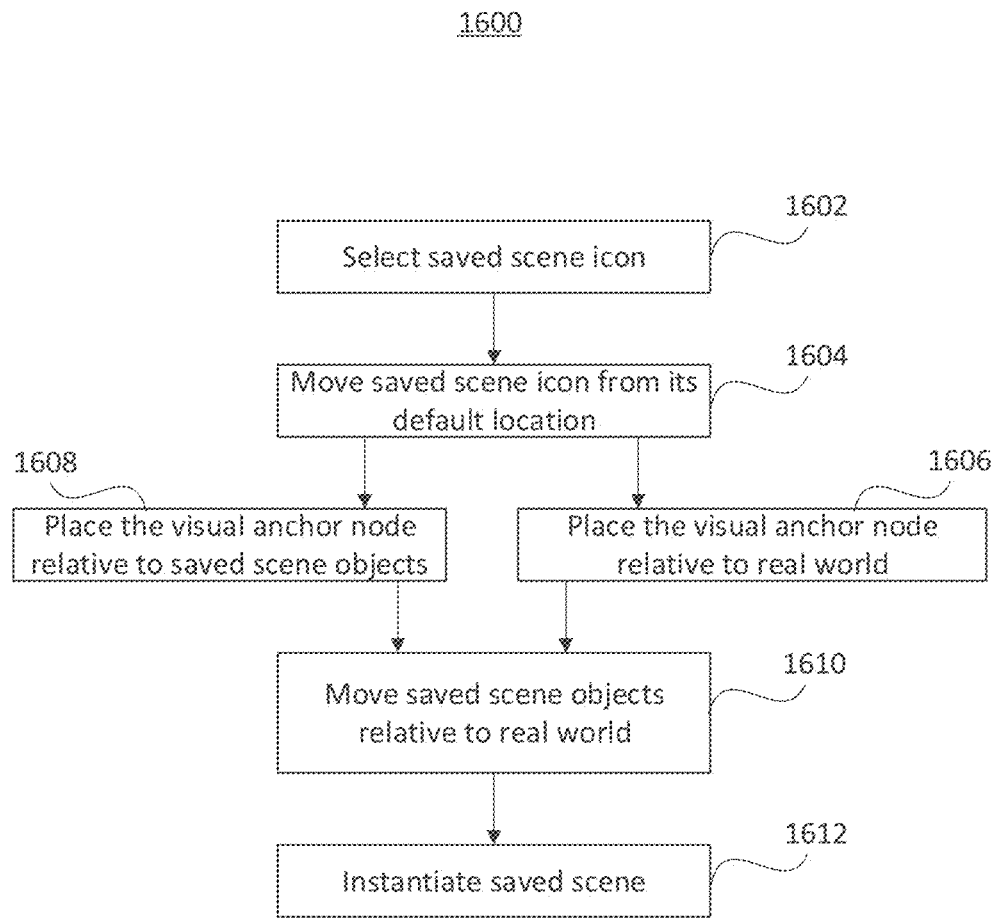
FIG. 16 illustrates an example process 1600 for loading a scene using the system and methods described herein.

FIG. 16 illustrates an example process 1600 for loading a scene using the system and methods described herein.

At step 1602, a saved scene icon may be selected. In some embodiments, step 1602 may be the same as step 1502 and/or 1404. In some embodiments, the saved scene icon may be a visual representation of the saved scene and/or the saved scene data. In some embodiments the saved scene icon may be the same visual representation as the visual anchor node. In some embodiments, the saved scene icon may comprise the visual anchor node.

At step 1604, the saved scene icon may be moved from its default location. In some embodiments, step 1604 may be the same as step 1504 and/or 1406. In some embodiments, step 1604 may comprise moving a totem around while holding down a button on a totem. In some embodiments, step 1602 may comprise pushing and releasing a button on a totem to select the object and step 1604 may comprise moving the totem around which may cause the saved scene to have corresponding movements as the totem.

In some embodiments, the saved scene may be loaded in the same location as it was originally saved (e.g. the saved scene objects are in the same real world location they were in when the scene was originally saved). For example, if the user created a scene in the user's kitchen, the user may load the scene in the user's kitchen. In some embodiments, the saved scene may be loaded into a different location than the scene was originally saved. For example, if the user saved a scene at their friend's house, but the user wants to continue interacting with the scene at home, the user may load the saved scene at the user's home. In some embodiments, this split in process 1600 may correspond to the split between 1432 and 1434 in process 1400.

At step 1608, the visual anchor node may be placed relative to the saved scene objects. In some embodiments, this may occur when the saved scene PCF matches the user's current PCF (i.e. the scene is loaded at the same location it was saved). For example, the application may be programmed to automatically place the saved scene objects (e.g. preview place) at the same real world location as where they were saved. In this case, the initial placement of the saved scene icon from its default location functions to place the visual anchor node relative to the already placed saved scene objects. In some embodiments, when the saved PCF matches the current PCF, the system may automatically place, for example preview place, the saved scene objects in the user's environment, and step 1608 may determine the location for the saved scene anchor. In some embodiments, once the visual anchor node has been placed 1608, the relative spatial location between the visual anchor node and the saved scene objects may be fixed.

At step 1606, the visual anchor node may be placed relative to the real world. In some embodiments, user input may be obtained on the location of the visual anchor node when the saved scene PCF does not match the user's current PCF, and/or if the user's current PCF cannot be obtained. Alternatively or additionally, the process may proceed to step 1608 where the system may receive input to position the visual anchor node relative to saved scene objects. For example, the application may be programmed to automatically place the visual anchor node relative to the saved scene objects. In some embodiments, the visual anchor node may be automatically placed at the center of the saved scene objects (as its placement relative to the saved scene objects). Other suitable relative placement method may be used.

At step 1610, the saved scene may be moved relative to the real world. By this step in process 1600, the visual anchor node has been placed relative to the saved scene objects (steps 1608 or 1606) and the saved scene objects have been preview placed at an initial location in the user's real world (for path 1608 the saved scene objects are automatically placed in the same real world location as they were saved, and for path 1606, the saved scene objects are placed at a specified spatial configuration relative to the visual anchor node). The saved scene may optionally be moved at step 1610. In some embodiments, step 1610 may be steps 1510, 1416-1420, and/or 1210. In some embodiments, step 1610 is not performed and process 1600 proceeds directly to step 1612.

At step 1612, the saved scene may be instantiated. In some embodiments, step 1612 may be steps 1512, 1414, and/or 1212. In some embodiments, the application may have already loaded the saved scene into volatile memory during step 1602, so at step 1612 the scene may feed the full saved scene data into a render pipeline. The saved scene may then be capable of display to the user through the wearable device, for example wearable device 200, as an exact copy of the saved scene (e.g. same relative spatial relationship between saved scene objects), except optionally at a different location in the user's real world.

In some embodiments, the wearable system and the application may be used interchangeably. The application may be downloaded onto the wearable system, thus becoming part of the wearable system.

Figure 21A:
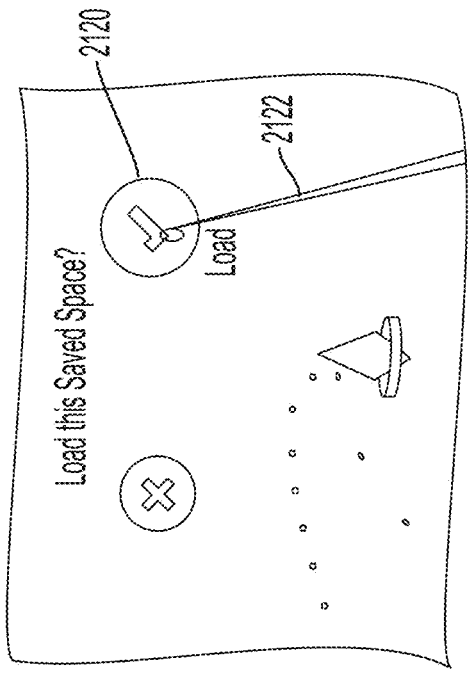
FIG. 21A is a sketch of a portion of an exemplary user environment of an augmented reality system in which a user is providing input to move a visual anchor node that has associated with it saved scene objects shown in a preview mode.
Figure 21B:
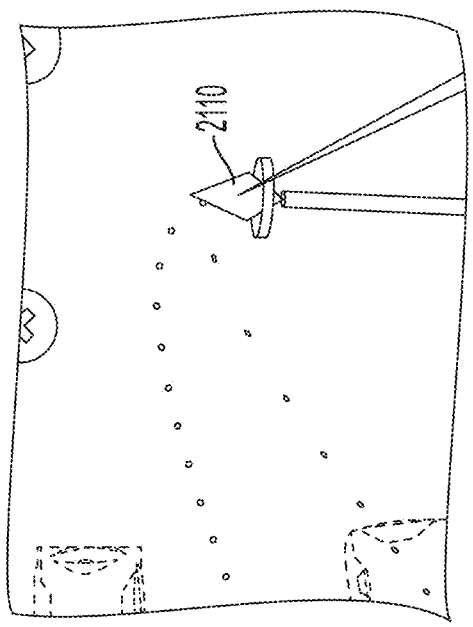
FIG. 21B is a sketch of the portion of an exemplary user environment of FIG. 21A in which the user is providing input to select a LOAD icon, to indicate loading of a saved scene.
Figure 21C:
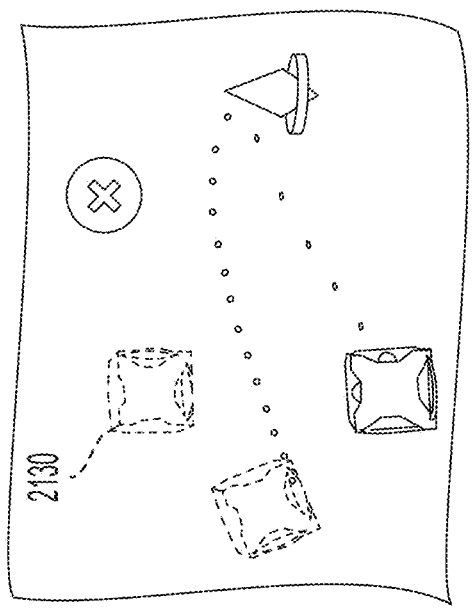
FIG. 21C is a sketch of the portion of an exemplary user environment of FIG. 21B, after the user selected the LOAD icon, and the saved scene objects, associated with the visual anchor node the user is providing input to select a LOAD icon, to indicate full instantiation of saved scene objects in a location indicated by the specified position of the visual anchor node.

An example of what a user of an augmented reality system might see while opening a saved scene is provided by FIGS. 21A-C. In this example, a user interface in which a user might activate a control to move the visual anchor node 2110 is shown. FIG. 21A illustrates the user moving visual anchor node 2110. In this example, the saved scene consists of cubic objects, which are visible in a preview mode in FIG. 21A. In this example, the saved scene has a saved scene anchor node, which is coincident with the visual anchor node. The saved scene objects have, in this example, a predetermined relationship with respect to the saved scene anchor node and therefore a predetermined relationship with respect to the visual anchor node. That relationship is indicated by the dotted lines visible in FIG. 21A.

FIG. 21B illustrates the user loading a saved scene with the visual anchor node in a desired location by activating a load icon 2120. In this example, user selection is shown by a line 2122, mimicking a laser pointer, to a selected icon. In an augmented reality environment, that line might be manipulated by a user moving a totem, pointing a finger or any other suitable way. Activating a control, such as the LOAD control in this example, may occur as a result of a user providing some other input, such as pushing a button on the totem, while an icon associated with the control is selected.

FIG. 21C illustrates virtual content 2130, here illustrated as blocks, being instantiated relative to the saved scene anchor node, which is aligned with the specified visual anchor node. On contrast with the preview mode of FIG. 21A, the saved scene objects may be rendered with full color, physics and other attributes of virtual objects.

Exemplary Embodiments

Concepts as discussed herein may be embodied as a non-transitory computer readable medium encoded with computer-executable instructions that, when executed by at least one processor, operate a mixed reality system of the type maintaining an environment for a user comprising virtual content configured for rendering so as to appear to the user in connection with a physical world to select a saved scene, wherein each saved scene comprises virtual content and positions with respect to a saved scene anchor node and determine whether the saved scene anchor node associated with the selected scene is associated with a location in the physical world. When the saved scene anchor node is associated with a location in the physical world, the mixed reality system may add the virtual content to the environment at a location indicated by the saved scene anchor node. When the saved scene anchor node is not associated with a location in the physical world, the mixed reality system may determine a location in the environment and adding the virtual content to the environment at the determined location.

In some embodiments, determining the location in the environment when the saved scene anchor node is not associated with a location in the physical world comprises rendering a visual anchor node to the user and receiving user input indicating a position of the visual anchor node.

In some embodiments, determining the location in the environment when the saved scene anchor node is not associated with a location in the physical world comprises identifying a surface in the physical world based on similarity of affordances and/or attributes to a physical surface associated with the selected saved scene and determining the location with respect to the identified surface.

In some embodiments, determining the location in the environment when the saved scene anchor node is not associated with a location in the physical world comprises determining the location with respect to the user.

In some embodiments, determining the location in the environment when the saved scene anchor node is not associated with a location in the physical world comprises determining the location with respect to the location of a virtual object in the environment.

In some embodiments, the computer-executable instructions configured to select a saved scene may be configured to automatically select a saved scene based on user position within the physical world with respect to the saved scene anchor node.

In some embodiments, the computer-executable instructions configured to select a saved scene may be configured to select a saved scene based on user input.

Concepts as discussed herein alternatively or additionally may be embodied as a non-transitory computer readable medium encoded with computer-executable instructions that, when executed by at least one processor, operate a mixed reality system of the type maintaining an environment for a user comprising virtual content configured for rendering so as to appear to the user to receive user input selecting from a library a first pre-built virtual sub-component and a second pre-built virtual sub-component and specifying a relative position of the first pre-built virtual sub-component and the second pre-built virtual sub-component; store as a scene virtual content comprising at least the first pre-built virtual sub-component and the second pre-built virtual sub-component by storing saved scene data comprising data identifying the first pre-built virtual sub-component and the second pre-built virtual sub-component and the relative position of the first pre-built virtual sub-component and the second pre-built virtual sub-component; render an icon representing the stored scene in a menu of a virtual user comprising icons for a plurality of saved scenes.

In some embodiments, the virtual content further comprises at least one built component.

In some embodiments, the virtual content further comprises at least one previously saved scene.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of operating a mixed reality system configured to display virtual content that is rendered to appear in a physical world, the method comprising:
   using at least one processor of the mixed reality system to perform:
      receiving user input specifying a plurality of subcomponents of one or more virtual objects and relative positions of the plurality of subcomponents;
      rendering, to the user, the plurality of subcomponents with the specified relative positions;
      receiving user input specifying a boundary of a region of the physical world in which a subset of the plurality of subcomponents of the one or more virtual objects are located;
      selecting the subset of the plurality of subcomponents for storage based on the boundary specified by the user input; and
      storing, in memory as a saved scene, only the subset of the plurality of subcomponents of the one or more virtual objects within the specified boundary of the region, the storing comprising storing a representation of the subset of the plurality of subcomponents, a node, and position information indicating a position of the subset of the plurality of subcomponents relative to the node.

2. The method of claim 1, further comprising obtaining the representation of the plurality of subcomponents by:
   placing a virtual render camera in the scene; and
   obtaining the representation of the subset of the plurality of subcomponents using the virtual render camera.

3. The method of claim 2, wherein obtaining the representation of the subset of the plurality of subcomponents using the virtual render camera comprises:
   converting, using the virtual render camera, 3D scene data representing the subset of the plurality of subcomponents to a 2D image storing the 3D scene data representing the subset of the plurality of subcomponents.

4. The method of claim 1, further comprising generating the position information at least in part by:
   determining a coordinate frame for the scene based on one or more features in an environment of the mixed reality system; and
   determining the position of the subset of the plurality of subcomponents relative to the node in the coordinate frame.

5. The method of claim 4, wherein determining the coordinate frame for the scene based on the one or more features in the environment of the mixed reality system comprises:
   selecting the coordinate frame from among a plurality of coordinate frames, each of the plurality of coordinate frames associated with a respective location in the physical world.

6. The method of claim 5, wherein selecting the coordinate frame from among the plurality of coordinate frames comprises:
   identifying, based on the one or more features in the environment of the mixed reality system, a first one of the plurality of coordinate frames that is associated with the first location; and
   selecting the first coordinate frame as the coordinate frame.

7. The method of claim 1 further comprising:
   in response to storing the scene in memory as the saved scene, adding a graphical icon associated with the saved scene to a user menu, wherein the graphical icon allows a user to access the saved scene.

8. A non-transitory computer-readable storage medium storing instructions that, when executed by at least one processor, cause the at least one processor to perform a method of operating a mixed reality system configured to display virtual content that is rendered to appear in a physical world, the method comprising:

receiving user input specifying a plurality of subcomponents of one or more virtual objects and relative positions of the plurality of subcomponents;

rendering, to the user, the plurality of subcomponents with the specified relative positions;

receiving user input specifying a boundary of a region of the physical world in which a subset of the plurality of subcomponents are located;

selecting the subset of the plurality of subcomponents for storage based on the boundary specified by the user input; and storing, in memory as a saved scene, only the subset of the plurality of subcomponents of the one or more virtual objects within the specified boundary of the region, the storing comprising storing a representation of the subset of the plurality of subcomponents, a node, and position information indicating a position of the subset of the plurality of subcomponents relative to the node.

9. The non-transitory computer-readable storage medium of claim 8, wherein the method further comprises:
loading the saved scene from the memory, the loading comprising rendering, to the user, the subset of the plurality of subcomponents of the one or more virtual objects at relative positions based on the position information.

10. The non-transitory computer-readable storage medium of claim 8, wherein the method further comprises:
receiving user input adding one or more subcomponents to the plurality of subcomponents and relative positions of the one or more subcomponents to obtain an updated plurality of subcomponents; and storing in the memory as an updated saved scene the updated plurality of subcomponents, a node, and updated position information indicating a position of the updated plurality of subcomponents relative to the node.

* * * * *